United States Patent
Johnson

(10) Patent No.: US 7,133,186 B2
(45) Date of Patent: Nov. 7, 2006

(54) AOM MODULATION TECHNIQUES EMPLOYING TRANSDUCERS TO MODULATE DIFFERENT AXES

(75) Inventor: Jay Johnson, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 74 days.

(21) Appl. No.: 11/138,075

(22) Filed: May 25, 2005

(65) Prior Publication Data

US 2005/0270629 A1    Dec. 8, 2005

Related U.S. Application Data

(60) Provisional application No. 60/577,796, filed on Jun. 7, 2004.

(51) Int. Cl.
*G02F 1/33* (2006.01)
*B23K 26/08* (2006.01)
*B23K 26/04* (2006.01)
*G02F 1/11* (2006.01)

(52) U.S. Cl. ............. 359/311; 219/121.78; 219/121.6; 219/121.61; 359/305; 359/307

(58) Field of Classification Search ............ 219/121.6, 219/121.61, 121.78, 121.79; 359/285, 305, 359/311
See application file for complete search history.

(56) References Cited

U.S. PATENT DOCUMENTS

| | | | |
|---|---|---|---|
| 4,532,402 A | 7/1985 | Overbeck | 219/121 LU |
| 5,197,074 A | 3/1993 | Emmons, Jr. et al. | 372/26 |
| 5,751,585 A | 5/1998 | Cutler et al. | 364/474.03 |
| 5,837,962 A | 11/1998 | Overbeck | 219/121.68 |
| 5,847,960 A | 12/1998 | Cutler et al. | 364/474.29 |
| 6,339,604 B1 | 1/2002 | Smart | 372/26 |
| 6,341,029 B1 | 1/2002 | Fillion et al. | 359/212 |
| 6,407,363 B1 | 6/2002 | Dunsky et al. | 219/121.71 |
| 6,430,465 B1 | 8/2002 | Cutler | 700/193 |
| 6,706,999 B1 | 3/2004 | Barrett et al. | 219/121.74 |
| 2002/0117481 A1 | 8/2002 | Unrath et al. | 219/121.8 |
| 2003/0086447 A1 | 5/2003 | Young et al. | 372/10 |
| 2005/0161444 A1 | 7/2005 | Kitai et al. | 219/121.73 |

OTHER PUBLICATIONS

Electro-Optical Products Corporation, Variable Frequency Source, www.eopc.com/ddsxx.html, visited May 14, 2004, 2 pages.

Electro-Optical Products Corporation, Acousto-Optic X-Y Scanning System, www.eopc.com/dtsxy100_dtsxy250_dtsxy400.html, visited May 14, 2004, 2 pages.

Analog Devices, AD9852 product pages, and Rev. B (pp. 2-44) plus two circuit diagrams, www.analog.com/en/prod/0,2877,AD9852,00.html, visited May 10, 2005.

(Continued)

*Primary Examiner*—David N. Spector
(74) *Attorney, Agent, or Firm*—Stoel Rives LLP

(57) ABSTRACT

Digital control of frequency and/or amplitude modulation techniques of an intracavity and/or extracavity AOM (60) facilitate substantially full extinction of a laser beam (90) to prevent unwanted laser energy from impinging a workpiece (80); facilitate laser pulse amplitude stability through closed-loop control of pulse-to-pulse laser energy; facilitate beam-positioning control including, but not limited to, closed-loop control for applications such as alignment error correction, beam walk rectification, or tertiary positioning; and facilitate employment of more than one transducer on an AOM (60) to perform any of the above-listed applications.

39 Claims, 24 Drawing Sheets

OTHER PUBLICATIONS

NEOS, AO Deflector Systems and Introduction to AO Modulators, www.neostech.com/neos/catalog/aodef.htm, visited May 14, 2004.
Claims from U.S. Appl. No. 11/138,659.
Claims from U.S. Appl. No. 11/138,076.
Claims from U.S. Appl. No. 11/138,078.
Claims from U.S. Appl. No. 11/138,662.
Claims from U.S. Appl. No. 11/138,657.
A.A. www.a-a.fr, AA.DDS.XX.pdf—DDS driver unit (Mar. 5, 2001).
A.A. www.a-a.fr, AA.DTS.XY.pdf XY—scanner (May 31, 2001).
A.A. www.a-a.fr, AA-AMP.B6-B7.pdf—linear RF amplifier (Feb. 1, 2000).
A.A., Acousto-optics from A.A. Sa, "Application Notes RF Drivers," www.a-a.fr, undated.
Hobbs, Philip C.D.; Building Electro-Optical Systems: Making It All Work, copyright 2000, John Wiley & Sons. -7.10.4 Acousto optic cells pp. 236-238.
NEOS Technologies, 21080-IDS/1AS, analog RF driver package.
NEOS Technologies, 31110-4AS, analog RF driver (Jul. 20, 2005).
NEOS Technologies, 38085-6AS, single output UV RF driver (1 page) (Apr. 20, 2004).
NEOS Technologies, 45125-2/10-.355-1, UV single axis deflector (1 page) (May 2, 2005).
NEOS Technologies, 64010-200-2AMDFS, DDS digital frequency RF Driver (4 pages) (Dec. 14, 2004).
O'Shea, Donald C. ; PHYS 4220 Optical System Design, Georgia Tech School of Physics, Spring 2004, copyright 2004 Donald C. O'Shea, notes pp. 1-24.
Saleh, Bahaa E. A. and Teich, Malvin Carl; Fundamentals of Photonics, copyright 1991, John Wiley & Sons -Chapter 20: Acousto Optics pp. 800-819.
Wagner, Kelvin; Experiment No. 134, Acousto-Optic Devices, Department of Electrical and Computer Engineering, University of Colorado at Boulder, Optics Lab—ECEN 5606, pp. 1-25 (Apr. 5, 2004).

FIG. 22
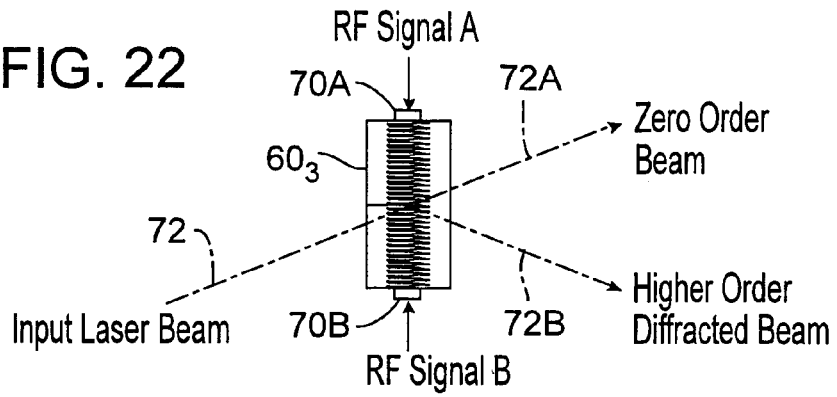
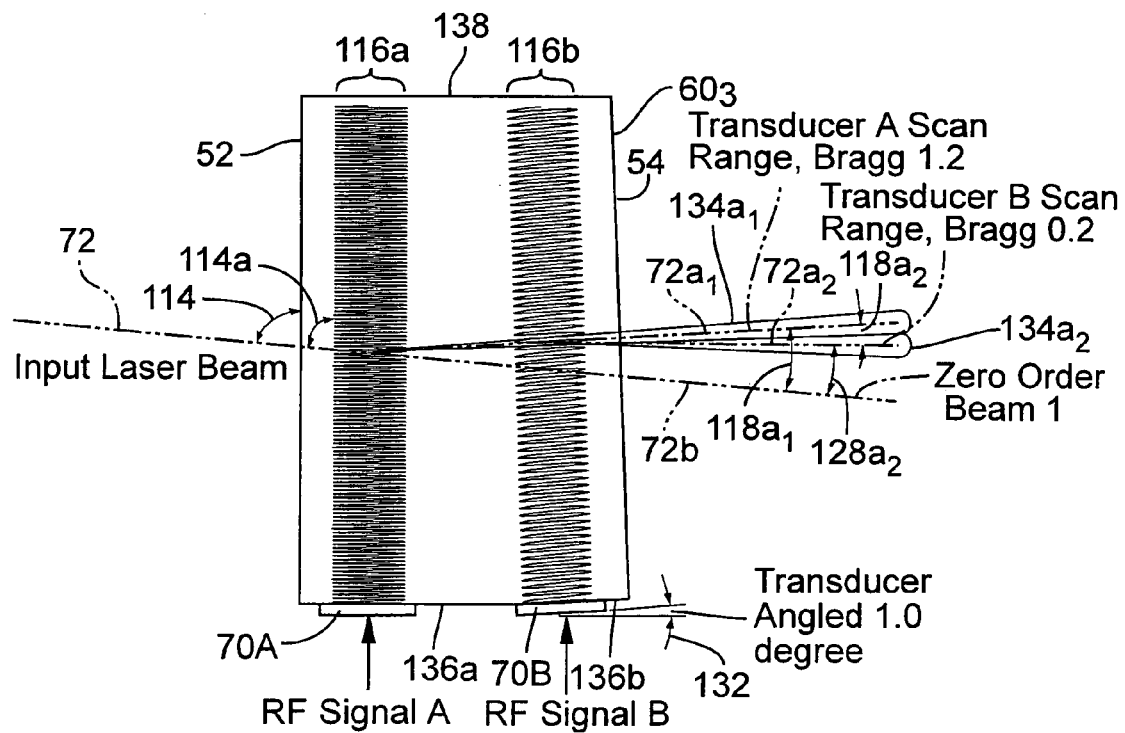
FIG. 23C

AOM MODULATION TECHNIQUES EMPLOYING TRANSDUCERS TO MODULATE DIFFERENT AXES

RELATED APPLICATION

This patent application claims benefit of U.S. Provisional Application No. 60/577,796, filed Jun. 7, 2004.

COPYRIGHT NOTICE

© 2005 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

The present invention relates to laser micromachining and, in particular, to methods and systems employing AOM frequency and/or amplitude modulation to improve laser machining performance.

BACKGROUND OF THE INVENTION

FIG. 1 is a schematic diagram of a typical prior art laser 2 employing a traditional acousto-optic Q-switch 10a. FIGS. 2A and 2B (generically, FIG. 2) are alternative partly schematic views of a prior art acousto-optic modulator (AOM) 10 having a transducer 12 responsive to a radio frequency (RF) driver 14 that controls the extent to which the AOM 10 transmits a zero-order beam 16 and/or a first-order beam 18. FIG. 3 is a schematic view showing the traditional technique for controlling the RF driver 14. With reference to FIGS. 1–3, AOMs 10 have traditionally been used as Q-switches 10a within the resonators of lasers 2 to control pulse timing, repetition rate, and cavity gain. A typical Q-switch 10a (or a typical AOM 10) includes an RF transducer 12 that is amplitude-modulated by the RF driver 14 at a specific frequency set by a manufacturer. The Q-switch 10a is typically controlled by a laser system controller 4 that commands a power supply 14a to provide a selectable amount of power to the RF transducer 12 to allow laser pulses to either exit the laser or to hold the laser energy inside the laser resonator. The power supply 14a also typically provides power to a laser pumping source 6 to provide pumping radiation to a laser medium 8 in response to commands from the laser system controller 4. These components cooperate to produce a pulsed laser beam 20 when desired.

AOMS 10 have also been used as variable intra-resonator loss modulators to control laser pulse timing and intensity by variably controlling the amplitude of the RF signal delivered to the RF transducer(s) 12 on the AOM(s) 10 as described in U.S. Pat. No. 5,197,074 of Emmons, Jr. et al. AOMs 10 have also been used as extra-cavity beam attenuators that control the intensity of the laser beam 20 by diffracting the laser beam 20 with varied diffraction efficiency so that a percentage of the optical energy travels down a desired beam path and most of the rest of the optical energy travels to a "beam dump."

More recently, Electro Scientific Industries, Inc. of Portland, Oreg. has employed AOMs 10 as gating control devices or "pulse pickers" to allow pulses from a laser 2 to propagate through or along various positioning system components to impinge a workpiece when commanded and to inhibit the laser pulses from impinging the workpiece when not commanded. This process is described in more detail in U.S. Pat. No. 6,172,325 of Baird et al.

With reference again to FIGS. 2 and 3, the transducer 12 converts an RF input signal from the analog RF driver 14 into a sound wave 19 that sets up in the AOM 10. As the sound wave 19 transverses through the AOM 10, the sound wave 19 distorts the optical media of the AOM 10, causing increases and decreases in indexes of refraction in the AOM 10. Thus, an incoming laser beam 20 is diffracted by the sound wave 19 and follows the laws of diffraction, resulting in the zero-order beam 16 that is on-axis and in first-order (or higher-order) beams 18 at angles specified by equations relating to the diffraction process.

When no RF power 22 is applied to the AOM 10, the incoming laser beam 20 passes through the AOM 10 substantially along its original beam path. When the RF power 22 is applied to the AOM 10, part of the incoming laser beam's energy is diffracted from the beam path of the zero-order beam 16 to a beam path of a first-order beam 18. The diffraction efficiency is defined as the ratio of the laser energy in the first-order beam 18 to the laser energy in the incoming laser beam 20.

With reference to FIG. 4, either the first-order beam 18 or the zero-order beam 16 can be used as a working beam to impinge a workpiece 30, based on different application considerations. When the first-order beam 18 is used as the working beam, the energy of the working laser pulses can be dynamically controlled from 100% of its maximum value down to substantially zero, as the RF power 22 changes from its maximum power to substantially zero, respectively. Because the practical limited diffraction efficiency of an AOM 10 under an allowed maximum RF power load is about 75% to 90%, the maximum energy value of the working laser pulses is about 75% to 90% of the laser pulse energy value from the laser.

However, when the zero-order beam 16 is used as the working beam, the energy of the working laser pulses can be dynamically controlled from about 100% (minus losses from traveling through the AOM 10, perhaps as much as a few percent due to thermal and dispersion considerations) of the maximum value of the laser pulse energy from the laser down to about 15% to 20% of the maximum value, as the RF power 22 changes from substantially zero to its maximum power, respectively. For memory link processing, for example, when the working laser pulse is not on demand, no leakage of system laser pulse energy is desired (i.e., the working laser pulse energy should be zero), so, as shown in FIG. 4, the first-order beam 18 is used as the working beam and the zero-order beam 16 is directed to a beam dump, such as an absorber 32.

An extinction ratio 34 of the AOM 10 defines the difference in transmitted power of a laser pulse 36 (36a or 36b) between an "unblocked" (or "transmitting") state 38 and a "blocked" or "nontransmitting" state 40. FIG. 5 is a simplified generic graph showing the differences in transmittance of blocked and unblocked laser beam 20 as a function of decibel (dB) level applied to the AOM 10 at a specific frequency. With reference to FIGS. 3 and 5, conventional AOMs 10 used in pulse-picking laser systems receive, from a constant frequency generator 24 (typically a PLL or a crystal), a specific single radio frequency that is set by a manufacturer and cannot be changed. This frequency determines the output angle and controls the amount of diffraction by RF amplitude within the limits of the extinction ratio 34.

The amplitudes of the signals sent to the analog RF drivers 14 of conventional AOMs 10 can be controlled by either sending a transistor-transistor logic (TTL) "ON" or "OFF" signal from an on/off digital controller 26, and/or by sending an analog signal of 0–1 volt in non-integer increments from an analog amplitude control board 28, into the RF driver 14. The TTL "OFF" signal directs the analog RF driver 14 to lower the output to the minimum level, which is the lowest power output the RF driver 14 will allow. Setting the analog signal into the RF driver 14 at its minimum level will accomplish the same result. Both of these options will, however, still allow the transmission of a small amount of RF power 22 to transducer 12, creating a low-energy diffracted first-order beam 18 that passes to the workpiece 30 when it is not wanted.

As laser powers continue to increase for a variety of laser applications (such as laser DRAM processing, laser trimming and micromachining, and laser micro-via drilling), many of these laser applications seek the ability to turn completely off the laser power to the work surface. In these laser operations, the workpiece may be expensive in terms of materials and/or prior processing. If the laser output does not turn completely off, there is potential to "leak" or diffract energy to the workpiece in locations where damage to, change to, or effect on the material properties or characteristics is unacceptable. In laser trimming, unwanted energy could, for example, induce undesirable electro-optical effects in the material that are undesirable. Regardless of the laser operation, leaked laser energy has the potential to cause significant irreversible damage to a customer's product, such as devices on a wafer, and such damage may not necessarily be noticeable by visual inspection. Energy leakage problems in laser systems can occur in a continuous range of wavelengths, including long-wavelength $CO_2$ (about 10 μm), infrared and near infrared (such as 1.3 μm to 1.0 μm), visible, and UV (less than about 400 μm).

With the increasing use of AOMs 10 in laser processing applications, energy leakage problems become increasingly more evident. Unfortunately, even when the minimum RF level is sent to state-of-the-art AOM controllers, there is still some RF power 22 that leaks into the AOM 10, causing some amount of laser beam energy to be diffracted to a potentially unwanted location. Such leakage can also occur when traditional Q-switches 10a are employed, allowing for some laser energy to exit the laser 2 during the laser energy buildup time when laser output is undesirable.

SUMMARY OF THE INVENTION

Certain embodiments and techniques described herein can achieve a variety of laser processing advantages over conventional laser systems and conventional laser machining methods. These embodiments and techniques include, but are not limited to, one or more of the following: digital control of frequency and/or amplitude AOM modulation techniques; intracavity and/or extracavity AOM modulation techniques including, but not limited to, frequency and/or amplitude modulation that facilitate substantially full extinction of a laser beam to prevent unwanted laser energy from impinging a workpiece; AOM modulation techniques of pulse-to-pulse laser energy with closed-loop control to facilitate laser pulse energy stability; and frequency and/or amplitude AOM modulation techniques for facilitating beam-positioning control including, but not limited to, employing more than one transducer on an AOM, employing closed-loop control for applications such as alignment error correction, beam walk rectification, or tertiary positioning.

An object of the invention is, therefore, to provide improved laser system performance through one or more selected AOM applications.

Additional objects and advantages of this invention will be apparent from the following detailed description of preferred embodiments, which proceeds with reference to the accompanying drawings.

BRIEF DESCRIPTION OF THE DRAWINGS

FIG. 22 is a schematic diagram of an AOM employing at least two transducers to divert a beam that is angled to the AOM entrance surface.

FIG. 23C is a schematic diagram demonstrating the effects of two transducers positioned at different angles to each other to expand beam-positioning range.

DETAILED DESCRIPTION OF PREFERRED EMBODIMENTS

Figure 1:
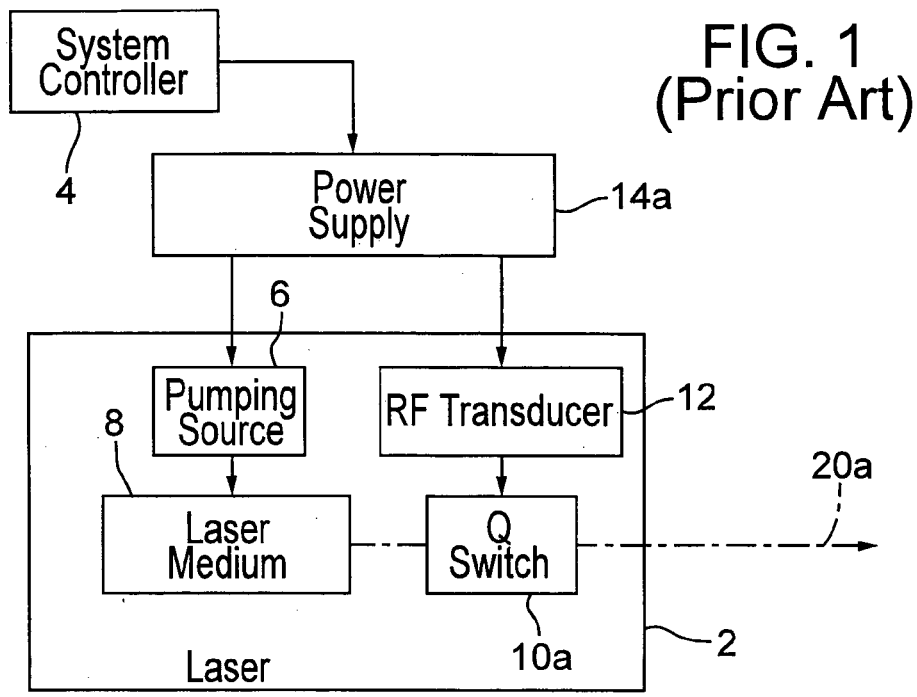
FIG. 1 is a schematic diagram of a conventional laser employing a prior art AOM device as a Q-switch.
Figure 2A:
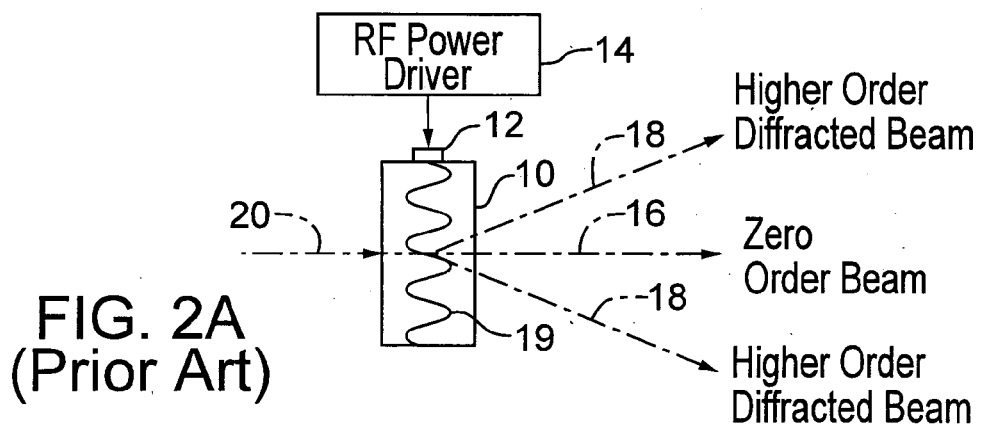
FIGS. 2A and 2B are alternative schematic diagrams of a prior art AOM device that transmits proportions of zero-order and first-order beams in response to the amount of RF power it receives.
Figure 2B:
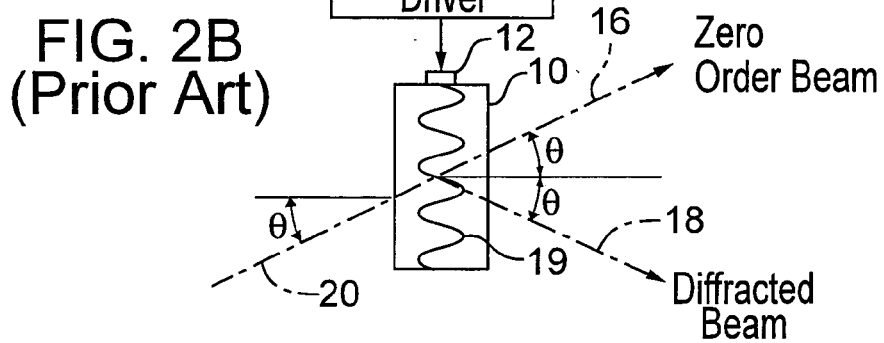
Figure 3:
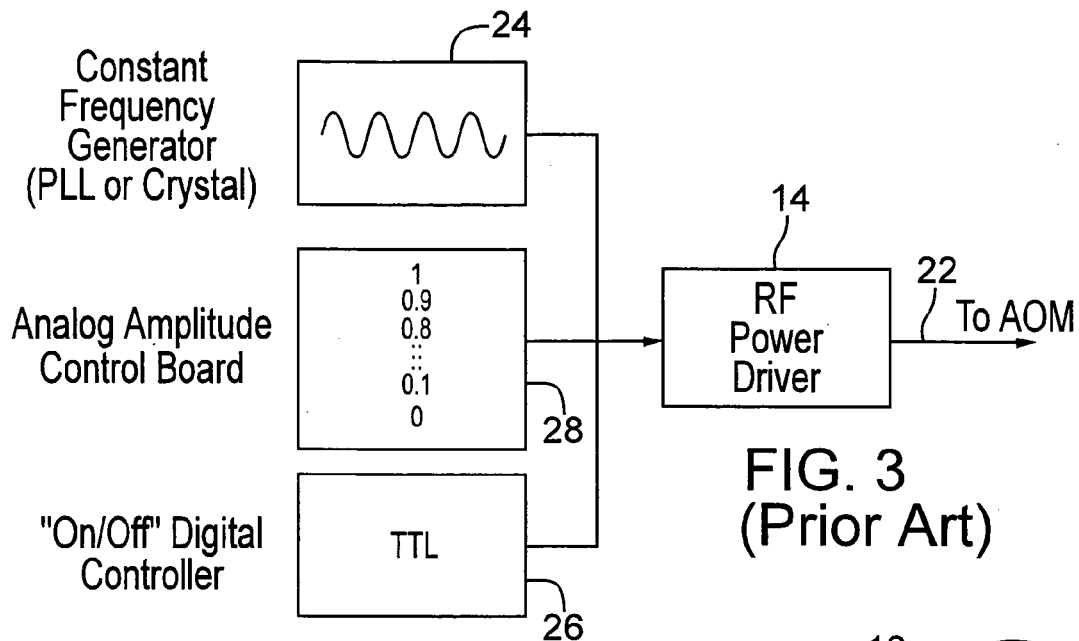
FIG. 3 is a schematic diagram showing a method for controlling a prior art AOM device.
Figure 4:
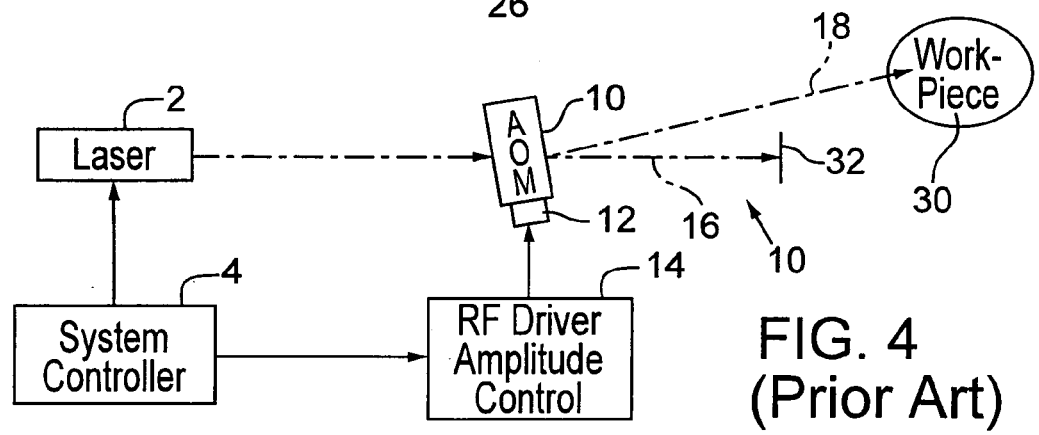
FIG. 4 is a schematic diagram of a laser system employing a prior art AOM device as a pulse gating device.
Figure 5:
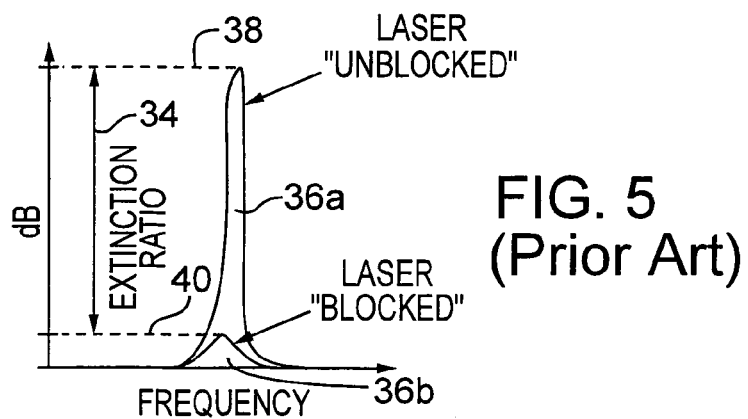
FIG. 5 is a simplified graph showing differences in transmittance of blocked and unblocked laser beams as a function of decibel level applied to an AOM at a specific frequency.
Figure 6:
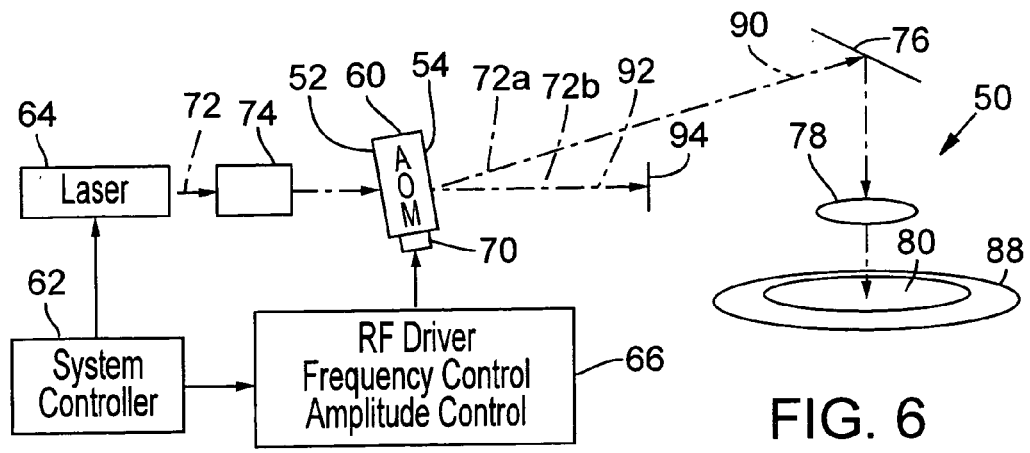
FIG. 6 is a schematic diagram of a laser system employing a frequency-modulated AOM.

FIG. 6 shows an embodiment of a laser system 50 that employs a modulation-enhanced AOM 60 as a pulse gating device, the AOM 60 having a beam entrance surface 52 and a beam exit surface 54. With reference to FIG. 6, a laser system controller 62 provides control signals directly or indirectly to a laser 64 and an RF driver 66 that directly or indirectly controls the performance of the AOM 60 as described later in more detail. The laser 64 emits a laser beam that is propagated along an optical path 72 that may contain a variety of optical components 74, such as beam-expanding optics, or a variety of turn mirrors (not shown) before the laser beam enters the AOM 60 that propagates zero- and/or first-order beams 16 and 18. The laser beam is preferably a Q-switched or pulsed laser beam for most applications, but may be a continuous-wave (CW) beam for some applications.

Typically, one of the zero-order beams 16 or first-order beams 18 is subsequently directed by one or more turn mirrors 76 and a variety of optional beam-positioning components (not shown) through a focusing lens 78 to impinge one or more target positions on a workpiece 80. Either the zero-order beam 16 or the first-order beam 18 (or higher-order beam) can be used as a working beam 90 that propagates along a working beam path 72a to impinge the workpiece 80 that may be supported by a chuck 88 or other type of positioning system platform. The other of the first- or zero-order beams is a nonworking beam 92 that may be directed along a nonworking beam path 72b to a beam dump 94 such as a saturable absorber. Because it is preferable to use the first-order beam 18 as the working beam 90 for many embodiments, the figures will generally depict this arrangement.

Skilled workers will appreciate, however, that reverse logic and repositioning the working beam path 72a in connection with any AOM 60 discussed herein can be implemented without undue experimentation to employ embodiments with arrangements where the zero-order beam 16 is used as the working beam 90. In such embodiments, the AOM 60 can be employed to prevent greater than about 15% of the laser pulse energy from propagating along the beam path that impinges the workpiece 80, and preferably less than or equal to about 10% of the laser pulse energy is permitted to propagate along the beam path that impinges the workpiece 80 whenever no working beam is desired. Furthermore, such arrangements of AOM 60 permit the AOM to propagate greater than about 75% of the laser pulse energy along the beam path that impinges the workpiece 80 whenever such laser pulse energy is desired, and in some preferred embodiments greater than about 90% or even up to about 100% of the laser pulse energy can be propagated along the beam path that impinges the workpiece 80 whenever such laser pulse energy is desired.

With respect to the modulation-enhanced AOM 60, direct digital synthesis (or other high-speed signal-modulation technique) of the AOM driver signal allows the command of the AOM 60 to drive and modulate the radio frequency and amplitude of the RF drive signal at very high rates (such as up to or greater than 10 MHz serial and 100 MHz parallel) with excellent precision and stability. Such modulation techniques can be used to obtain full extinction from the AOM 60 in order to fully prevent laser energy from traveling down the working beam path 72a to the workpiece 80 to impinge at an undesirable time or location. These techniques can be employed in addition to traditional AOM modulation such as setting the amplitude of the AOM RF signal to a low level or "OFF" state.

Figure 7:
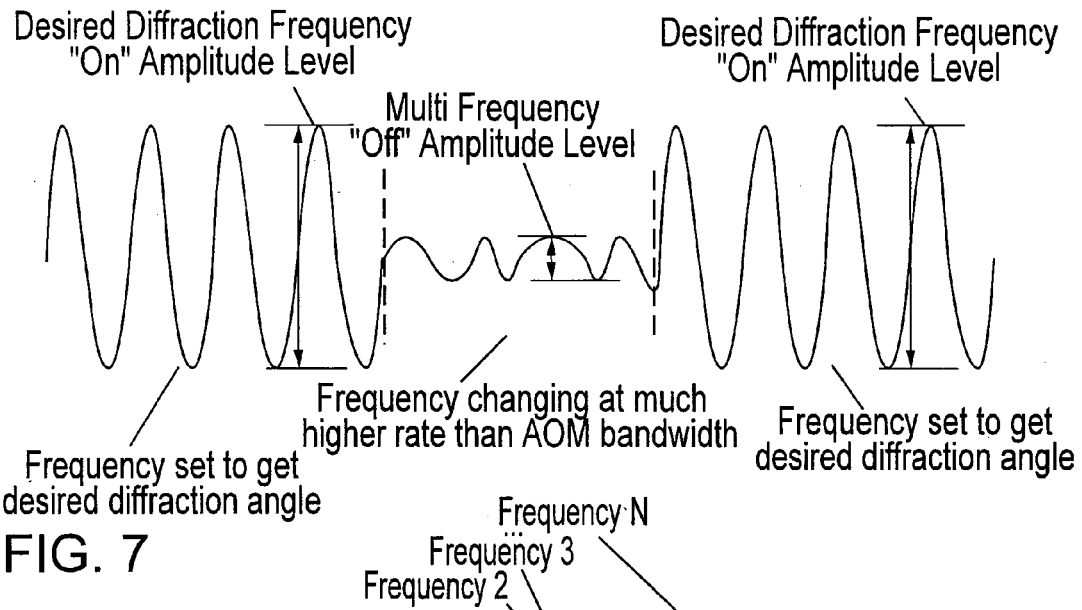
FIG. 7 is a timing diagram showing exemplary high-bandwidth frequency-shifting waveforms expressed by an AOM transducer to achieve full extinction from an AOM.
Figure 8:
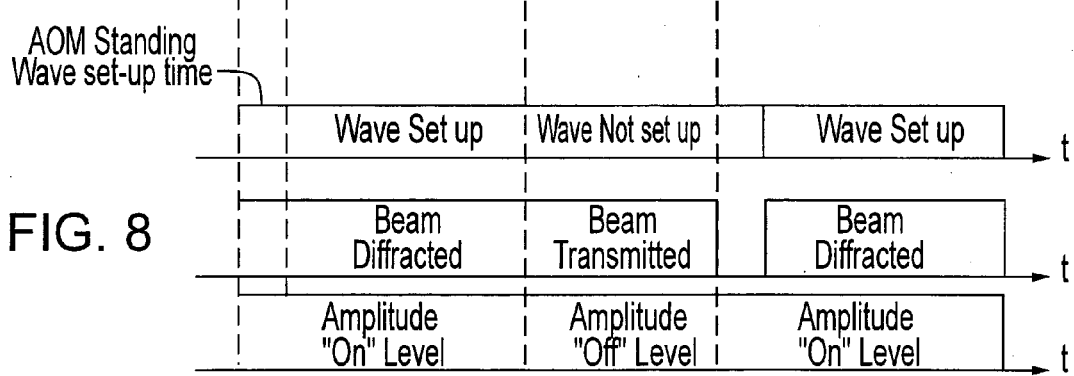
FIG. 8 is a timing flow table showing events and consequences in connection with employing high-bandwidth frequency shifting to achieve full extinction from an AOM.
Figure 9:
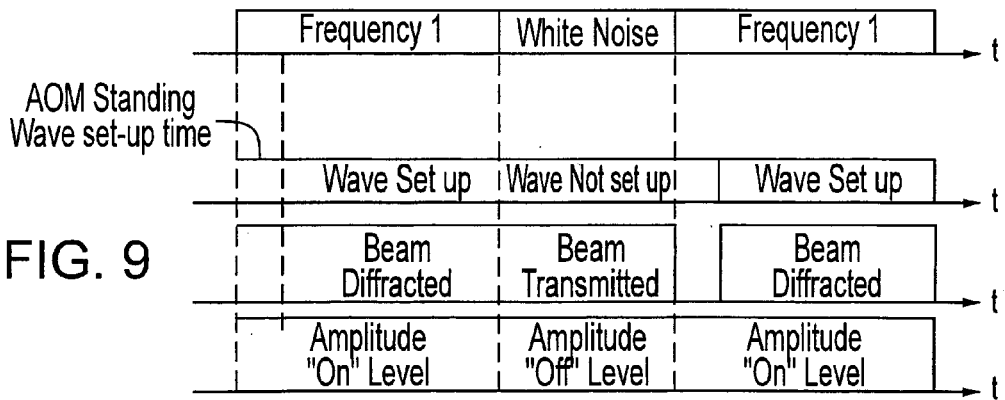
FIG. 9 is a timing flow table showing events in connection with employing white noise to achieve zero diffraction from an AOM.

FIGS. 7–9 depict timing diagrams showing exemplary techniques for modulating the radio frequency of the AOM 60 at a bandwidth greater than the bandwidth at which the AOM 60 can set up a sound wave to interact with light passing through the AOM 60. FIG. 7 is a timing diagram showing exemplary high-bandwidth frequency-shifting waveforms expressed by an AOM transducer 70 (FIG. 11) to achieve full extinction from the AOM 60. FIG. 8 is a timing flow table showing events and consequences in connection with employing high-bandwidth frequency shifting to achieve full extinction from the AOM 60.

With reference to FIGS. 6, 7, and 8, in one exemplary embodiment the RF signal of the RF energy sent to the AOM 60 is modulated in the "OFF" state at a higher rate than the bandwidth of the AOM 60. In some embodiments, the bandwidth of the AOM 60 can be defined by a function of the time a sound wave takes to travel across the waist of a laser beam traveling along optical path 72. The bandwidth is, therefore, affected by the diameter of the laser beam and the speed of sound in the medium of the AOM 60. By dividing the diameter of the laser beam by the speed of sound in the material of the AOM 60, one can obtain the transit time of the sound across the laser beam. Converting the transit time into frequency (1/transit time) can provide the maximum bandwidth of the AOM 60 with respect to such embodiments.

Modulating the radio frequency of the RF signal, at a higher bandwidth than that which the AOM 60 can accommodate, can prevent a sound wave from setting up in the AOM 60, and thereby prevent diffraction of the laser beam traveling along optical path 72. Optical diffraction of the light passing through the AOM 60 can be prevented for as long as the radio frequency is changing at a rate greater than the bandwidth of the AOM 60. In cases where the working beam path is an order greater than the zero order, the light energy will not be transferred to the higher orders.

In FIG. 7, in the "ON" state, the RF signal frequency is set to achieve the desired diffraction angle for the diffracted beam path 72a going to the workpiece 80, and the RF signal amplitude is set to achieve the desired energy level at the workpiece 80 to achieve a processing application such as link blowing or via drilling. In FIG. 7, in the "OFF" state, the RF signal frequency is changed at a high rate while also minimizing the RF signal amplitude, i.e., switching it off or switching to a low bias power level, to ensure no diffracted energy to the workpiece 80. FIG. 8 is a timing flow table that explains the consequences of the waveforms shown in FIG. 7. With reference again to the configuration shown in FIG. 6, where the beam path to the workpiece 80 is the diffracted beam 72a and the beam dump 94 receives a zero-order transmitted beam 72b, the laser energy will be fully transmitted during such higher bandwidth frequency modulation, and thus fully extinct (100%) to the workpiece 80.

FIG. 6 also represents a technique of setting the RF signal in the "OFF" state to a DC or very low-frequency signal level (or minimum amplitude level) as compared to the RF signal at which desired diffraction occurs. Such low-frequency signal or DC RF signal will not cause a beam to diffract to the optical path 72a to the workpiece 80. Modulation of the RF signal to a level that is DC in value or small enough to create no diffraction angle prevents a wave from setting up inside the AOM 60. Modulation of the RF signal to a minimum diffraction angle employs such a small RF signal that the diffracted beam will be virtually collinear with the transmitted beam to the beam dump 94. In the case of having a setting of zero frequency to the AOM 60, there will be no diffraction grating in the AOM 60, and 100% of light will be transmitted to the beam dump 94. In the "ON" state, the RF signal is set to achieve the desired diffraction angle (F1) for the optical path going to the workpiece 80 and the RF signal amplitude is set to achieve the desired energy level at the workpiece 80 for processing.

One source of a frequency signal suitable for implementing frequency modulation to extinguish a high-frequency RF signal to a low-frequency or DC level is a digital frequency synthesizer driving a digital-to-analog (D/A) converter. The A/D converter output and associated signal conditioning circuitry apply the frequency signal to an RF power driver to drive a controlled-impedance (typically 50 ohms) transmission line. An example of a commercially available frequency signal source is a Model AD 9852 ASQ direct digital synthesizer (DDS), which is manufactured by Analog Devices, Inc., Norwood, Mass. The Model AD 9852 ASQ is coupled with internal high-speed D/A converters and has an output update speed of 300 megasamples each second. Updates at 100 MHz can be achieved by controlling the AD 9852 ASQ DDS with a parallel digital interface exhibiting 48-bit frequency resolution, 14-bit phase offset resolution, and 12-bit amplitude control. The output of the Model AD 9852 ASQ can be applied to any one of a number of commercially available integrated RF driver modules, such as those manufactured by Motorola, Inc., and other integrated-circuit-device manufacturing companies, to drive the AOM transducer 70.

Greater flexibility in frequency signal and output control can be achieved by combining a digital signal processer (DSP), such as a Model TigerSHARC® manufactured by Analog Devices, Inc., with a field programmable gate array (FPGA), such as a Model Virtex-II manufactured by Xilinx, Inc., San Jose, Calif., and matching the integrated DDS with them.

Rapid switching from the "ON" state to the "OFF" state can be achieved by configuring the RF driver 66 to include a high-bandwidth operational amplifier with gain k receiving the D/A converter output and driving an inductor L. Choosing the value of L to set the resonance at the operating RF frequency in the "ON" state provides a large voltage at the input of the AOM transducer 70 without appreciable power consumption by the operational amplifier. (The resonant circuit includes the resistive losses of inductor L and the AOM transducer 70 and the capacitance of the AOM transducer 70.) The resonance causes transient ringing and thereby slows switching from the "ON" state to the "OFF" state.

The DDS can be used in conjunction with the DSP and FPGA to measure the transfer function from the D/A converter to the voltage at the input of the AOM transducer 70. Determining the transfer function can be accomplished by impulse response, swept-sine Bode plot, or white noise input/output measurement, using a D/A converter for the AOM transducer 70 input voltage and directing it to DSP/FPGA circuitry. Upon completion of the measurement, a digital biquad filter fit to invert the measured analog circuit frequency response is configured in an FPGA as a system-inverting notch filter to give a flat transfer function characterizing the analog drive circuit.

In accordance with linear systems theory, the combination of the FPGA biquad filter, the D/A converter input, and the analog drive circuit exhibits a flat transfer function, enabling instantaneous switching between zero DC or the RF "OFF" state and the RF "ON" state. To instantaneously turn on the RF requires delivering a large amount of energy to start it up and extracting a large amount of energy to stop it. This may saturate the current/voltage/slew-rate capability of the operational amplifier at the required bandwidth.

To make the drive circuit useful, a ramp-up or ramp-down of the RF signal may be desired. These functions could be readily implemented in DSP/FPGA by multiplying the sine wave with k_ramp*t for the ramp-up, and (1-k_ramp*t) for the ramp-down. The k_ramp parameter would be devised to the linear operating limits of the operational amplifier current, voltage, and slew-rate outputs, and would be chosen on a design-specific basis, not tuned for component variations. While the ramp-up/ramp-down requires time, it is expected that this time would be significantly less than the time required to let the transient naturally decay.

The output of the DDS board then can be put into an RF power module, which will then couple in the 50-ohm transmission line to the AOM transducer 70.

FIG. 9 presents an alternative but similar technique to modulating the radio frequency at a higher rate than the AOM bandwidth by injecting white noise into the RF signal. By having multiple frequency components at a wide bandwidth spectrum in the signal, the AOM 60 will not have a sound wave that can set up a diffraction grating in the AOM medium. With reference again to FIG. 6, in the "OFF" state, the white noise is sent to the AOM 60, causing the beam to completely transmit to the beam dump 94. In the "ON" state, the radio frequency is set to achieve the desired diffraction angle for the optical path 72a going to the workpiece 80 and the RF signal amplitude is set to achieve the desired energy level at the workpiece 80 for processing. Introducing white noise with a radio frequency higher than the setup time for the sound wave inside the AOM device will also give results as described.

Skilled persons will appreciate that the techniques discussed with respect to FIGS. 7–9 can be implemented using frequencies that have low or effectively zero efficiencies with respect to the Bragg equation. To achieve full extinction, the RF signal applied to the transducer 70 can simply be set to one of the frequencies that provides a Bragg efficiency of effectively zero, and the amplitude can optionally be set to zero or some baseline amount if desired. Alternatively, the frequency hopping and other techniques can utilize or be limited to frequencies that provide a Bragg efficiency of effectively zero.

Figure 10:
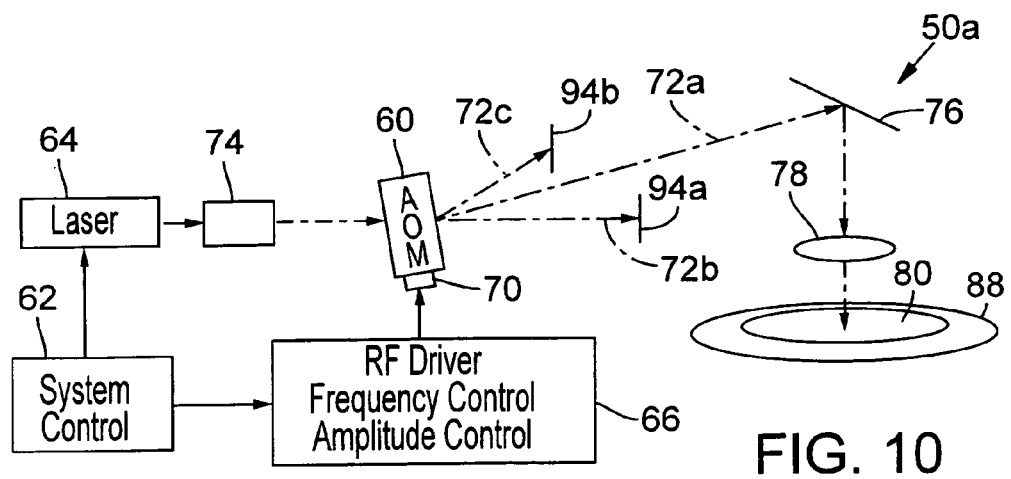
FIG. 10 is a schematic diagram of a laser system employing a frequency-modulated AOM and a secondary beam dump.

FIG. 10 presents a configuration of laser system 50a that is similar to laser system 50 but employs two or more beam dumps 94a and 94b. While the beam dump 94a is positioned along optical path 72b of the transmitted beam, the beam dump 94b is positioned along an optical path 72c by a radio frequency signal ($F_2$) that creates a diffraction angle ($F_2$) that does not lead to the workpiece 80. In the "ON" state, the RF signal is set to achieve the desired diffraction angle ($F_1$) for the optical path going to the workpiece 80, and the RF signal amplitude is set to achieve the desired energy level at the workpiece 80 for processing. In the "OFF" state, the RF signal is set to frequency $F_2$ and a minimum amplitude, which will produce a diffraction angle to cause the beam to diffract to the second beam dump 94b. The total laser energy in this "OFF" case will be shared between the transmitted beam and the $F_2$ diffracted beam, leaving the optical path 72a to the workpiece 80 free of laser energy.

Figure 11:
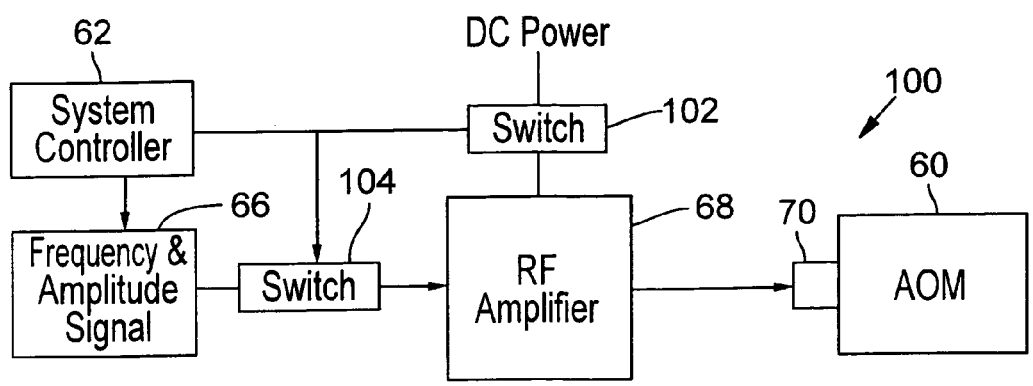
FIG. 11 is a schematic diagram of an AOM control system employing a DC power source switch.

FIG. 11 presents a simplified schematic diagram of an exemplary embodiment of an AOM control system 100 that employs the system controller 62 to control a control switch 102 to isolate power delivered to an RF amplifier 68 or the AOM transducer 70 and/or a control switch 104 to isolate the frequency signal from the RF driver 66 to the RF amplifier 68 or the AOM transducer 70. Exemplary embodiments of the control switches 102 and 104 have a fast switching and settling time, preferably greater than the repetition rate of the laser 64 to allow for the bandwidth of laser processing applications. The control switches 102 and 104 can be mechanical or solid-state relays or another type of device that can block the RF signal or power to the RF amplifier 68 or the AOM transducer 70. In the "ON" state, the DC power and the RF and amplitude signals are allowed to pass to the RF amplifier 68 and through to the AOM 60. In the "OFF" state, the DC power and/or the RF and amplitude signals are isolated from the AOM 60 by means of the control switches 102 and 104.

Figure 12:
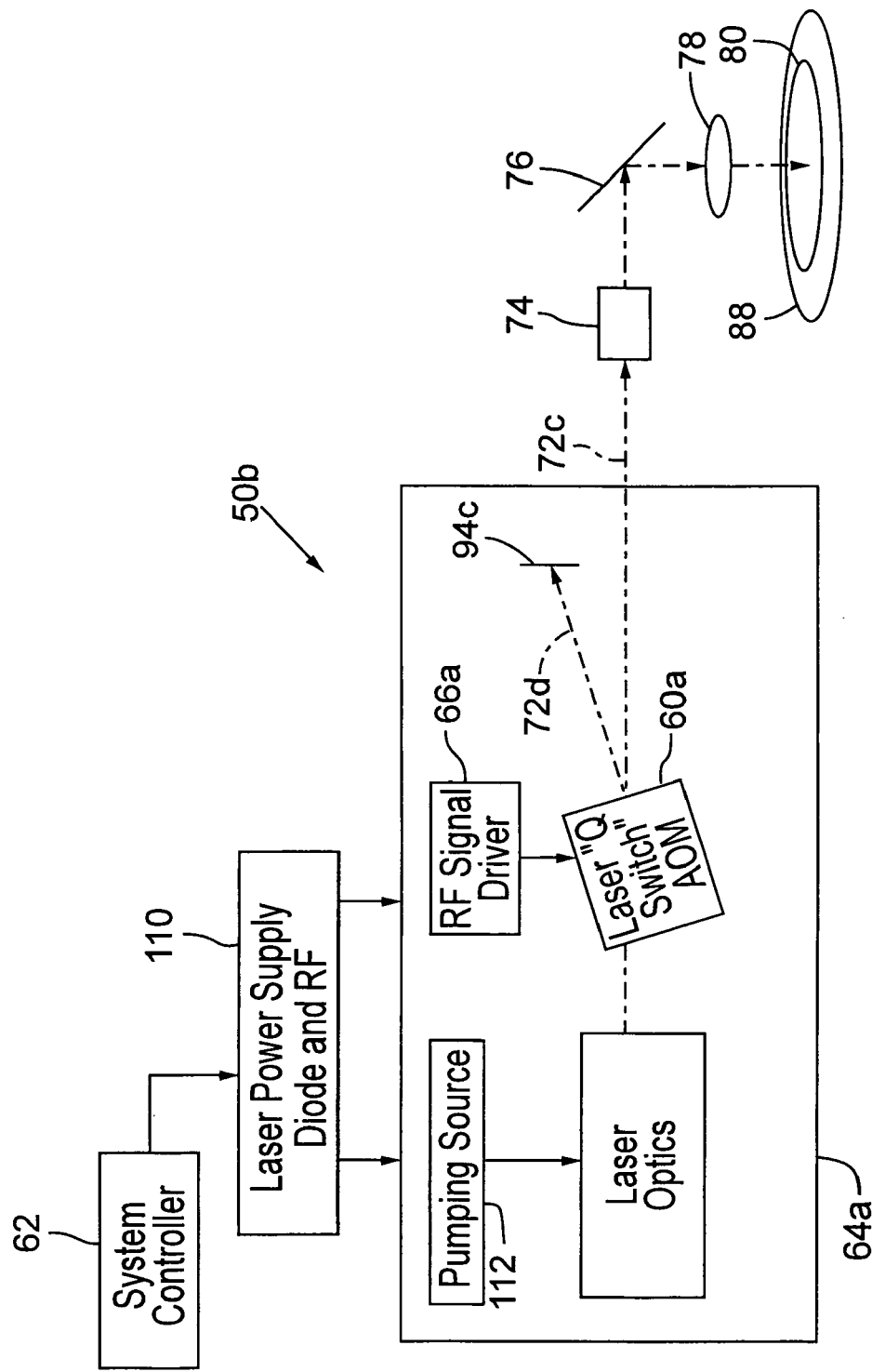
FIG. 12 is a schematic diagram of a laser system employing a frequency-modulated AOM as a Q-switch in the laser.

FIG. 12 shows an exemplary simplified schematic configuration of a laser system 50b that utilizes aforementioned AOM modulation techniques to employ an AOM 60a as a Q-switch inside a laser 64a. Although a common power supply 110 may be employed to power a pumping source 112 and an RF signal driver 66a, the RF driver signal is generated and sent to the Q-switch AOM 60a in much the same way that AOM modulation control is previously described. In FIG. 12, however, AOM 60a is shown transmitting laser light along a working beam optical path 72c whenever AOM 60a is in an "OFF" state and diffracting light along a nonworking beam optical path 72d to a beam dump 94c whenever AOM 60a is in an "ON" state.

Skilled persons will appreciate that the AOM 60a could be adapted and oriented to work in the reverse configuration by diffracting the laser light to the working beam path when in the "ON" state. Regardless of configuration, the AOM modulation techniques previously discussed can be employed to achieve full extinction whenever laser energy to the workpiece 80 is not wanted, with or without the use of an external AOM 60.

Figure 13:
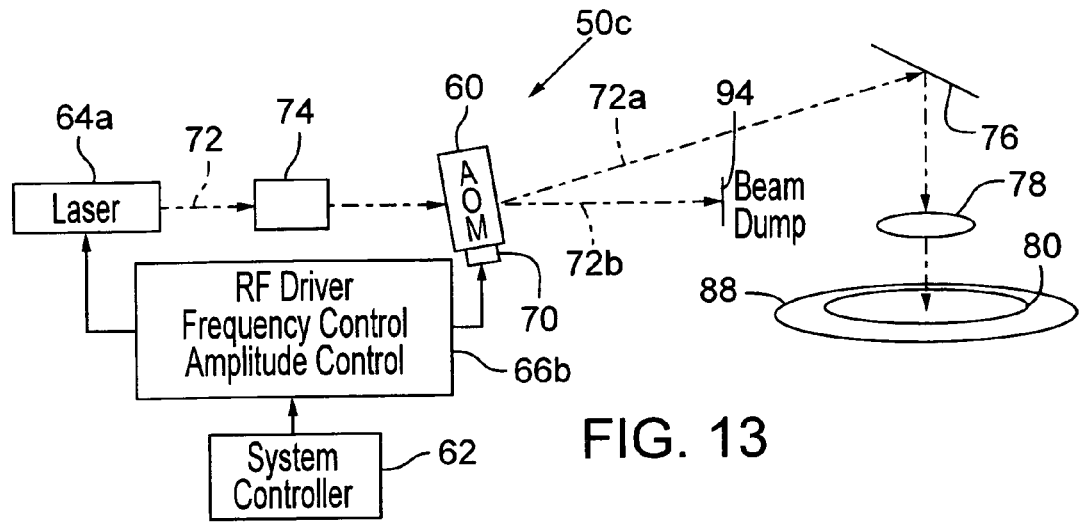
FIG. 13 is a schematic diagram of a laser system employing an extracavity frequency-controlled AOM and a frequency-modulated AOM as a Q-switch.

FIG. 13 shows an exemplary simplified schematic configuration of a laser system 50c that utilizes aforementioned AOM modulation techniques for employing the AOM 60 external to the laser 64a and the AOM 60a (not shown) internal the laser 64a to achieve full extinction. Skilled persons will appreciate that the AOMs 60 and 60a may be controlled through the same or separate RF drivers 66b.

Figure 14:
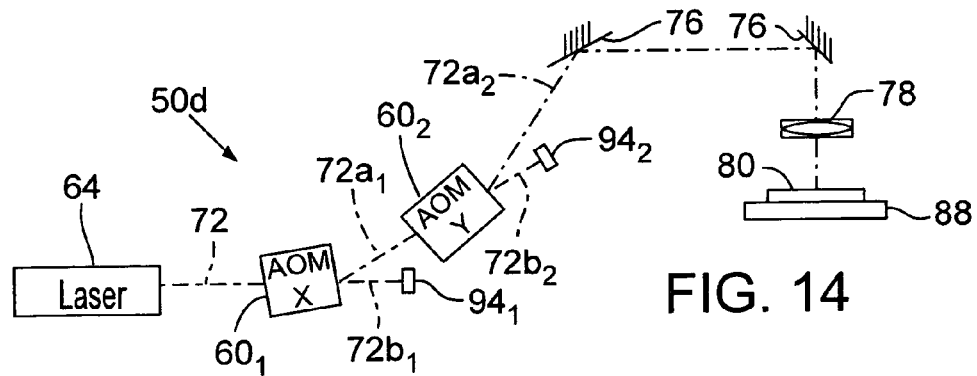
FIG. 14 is a schematic diagram of a laser system employing two extracavity frequency-controlled AOMs.

FIG. 14 shows an exemplary simplified schematic configuration of a laser system 50d that utilizes aforementioned AOM modulation techniques for employing two or more AOMs $60_1$ and $60_2$ in series external to the laser 64 to achieve full extinction, preventing even minimal energy from reaching the workpiece 80 and damaging it when a "blocked" state is wanted. With reference to FIG. 14, in an exemplary embodiment, AOM $60_1$ may in the "OFF" state transmit the laser light along an optical path $72b_1$ to a beam dump $94_1$ and in the "ON" state may diffract the laser light along an X axis (with respect to optical path $72b_1$) to a working beam optical path $72a_1$. The working beam optical path $72a_1$ intersects the AOM $60_2$, which may in the "OFF" state transmit the laser light along an optical path $72b_2$ to a beam dump $94_2$ and in the "ON" state may diffract the laser light along a Y axis (with respect to the optical path $72b_2$) to the working beam optical path $72a_2$ to eventually reach the workpiece 80. Skilled persons will appreciate that even though AOMs $60_1$ and $60_2$ are shown and described to alter the beam path along perpendicular axes, AOMs $60_1$ and $60_2$ may be adapted and positioned along the same axis or along transverse axes that are not perpendicular. Skilled persons will also appreciate that AOMs $60_1$ and $60_2$ may both be adapted and positioned to have the reverse "ON"/"OFF" state configurations (such as with the zero order being the working beam path), or may be adapted and positioned to have different "ON"/"OFF" state configurations. Additionally, the AOMs $60_1$ and $60_2$ may both be controlled through the same or separate RF drivers 66b (not shown).

With reference to FIGS. 13 and 14, a single AOM 60 can be defined to have an extinction ratio of N, while having two AOMs $60_1$ and $60_2$ in series will have extinction ratios of $N_1$ and $N_2$ that permit an increased total extinction ratio due to their additive attenuation values. Skilled persons will appreciate that N more AOMs 60 can be used to increase the total extinction ratio even more, as desirable for particularly sensitive workpieces 80 or particularly sensitive processing applications. The foregoing embodiments and permutations or combinations thereof can be employed to fully eliminate or divert laser pulse energy from reaching the workpiece 80 when such pulse energy is undesirable, eliminating the possibility of damaging sensitive materials.

Skilled persons will appreciate that these techniques can be applied to any type of laser including, but not limited to, solid-state lasers, such as Nd:YAG or Nd:YLF lasers, and $CO_2$ lasers, having wavelengths ranging from the deep UV through the far IR, including, but not limited to, wavelengths of about 266 nm, 355 nm, 532 nm, 1064 nm, 1320 nm, and 10 μm. These techniques can be utilized on laser processing systems, including link processing systems, laser trimming and micromachining systems, and micro-via drilling systems.

Figure 15:
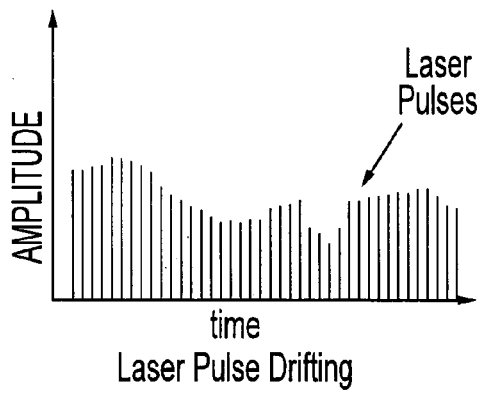
FIG. 15 is a graph of amplitude versus time showing typical peak energy drift between laser pulses.

One or more AOMs 60, with or without the above-described frequency modulation techniques, can also be used for a variety of other new applications. For example, FIG. 15 is a graph of amplitude versus time showing typical peak energy drift between laser pulses impinging a laser output detector due to various laser instabilities or thermal drifting. This pulse-to-pulse energy variation may be as much as 22% (even though the prolonged average variation may be less than 5%) in certain types of laser systems, especially UV systems at high repetition rates. Such variations in laser energy can potentially cause problems at the workpiece 80. For a given laser operation, the overall "processing window," which can be defined by variation tolerance in individual or sets of parameters (including laser output energy) that will not adversely affect the outcome of the product, can be relatively small. So, keeping the processing window large, or controlling the components that influence the processing window, and particularly the laser energy, can be very useful.

Figure 16:
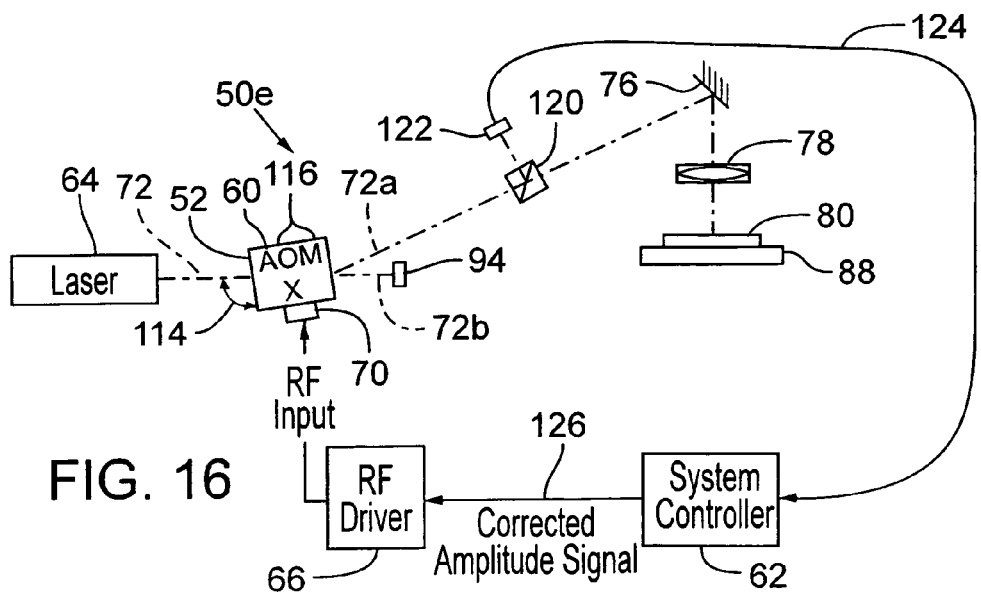
FIG. 16 is a schematic diagram of a laser system having closed-loop beam energy control that employs an extracavity amplitude and/or frequency-controlled AOM.

FIG. 16 shows an exemplary laser system 50e employing a beam-splitting optical element 120 to direct a portion of the laser output propagating along the beam path 72a to a laser output detector 122 that can be used to determine the incident amplitude and energy of the laser pulse going to the workpiece 80.

Although FIG. 16 shows the optical path 72 impinging the beam entrance surface 52 of the AOM 60 at an entrance angle 114 that is at or in proximity to a Bragg angle with respect to the beam entrance surface 52 or a transducer modulation zone 116 of the transducer 70, skilled persons will appreciate that the optical path 72 can be aligned to impinge the beam entrance surface 52 of the AOM 60 at a generally perpendicular non-Bragg entrance angle 114. Skilled persons will also appreciate that an angle cut can be used on the beam entrance surface 52 of the AOM 60 (particularly for AOMs 60 having high-refractive-index materials) so that the entrance angle 114 can be aligned perpendicularly to the beam entrance surface 52 and still substantially satisfy the Bragg condition for a given frequency.

Skilled persons will further appreciate that Bragg AOM alignment can be implemented with any embodiment previously or hereinafter described with respect to any of the figures. In general, satisfactory Bragg efficiency (or diffraction efficiency through the AOM 60) is achieved when the entrance angle 114 is within about ±0.5 degree of the Bragg angle with respect to the beam entrance surface 52 and/or the transducer modulation zone 116 that traverses the optical path 72. In some embodiments wherein the laser beam has a major IR wavelength component, the entrance angle 114 is preferably within about ±0.4 degree of the Bragg angle, more preferably within about ±0.1 degree of the Bragg angle, and of course most preferably at the Bragg angle. In some embodiments wherein the laser beam has a major UV wavelength component, the entrance angle 114 is preferably within about ±0.2 degree of the Bragg angle, more preferably within about ±0.05 degree of the Bragg angle, and of course most preferably at the Bragg angle.

With reference again to FIG. 16, the beam-splitting optical element 120, itself, can be an additional AOM 60. In some embodiments, the amplitude-controlling AOM 60 may be used as the beam-splitting optical element 120 where a higher-order beam or an opposite first-order beam is directed to the laser output detector 122. Skilled persons will further appreciate that additional laser output detectors 122 (and beam-splitting optical elements 120, as needed) may be positioned along beam path 72 upstream of AOM 60 and/or in the zero-order or nonworking beam path 72b to provide additional information for amplitude monitoring and control. In some embodiments, the beam-splitting optical element 120 and the laser output detector 122 can be placed at other downstream positions along the beam path so that the amplitude corrections may compensate for amplitude deviation caused by other components in the beam path 72a. Laser output detectors 122 are known to skilled practitioners and employed in many laser applications. The laser output detector 122 can, however, be adapted to send a signal 124 directly or indirectly to the system controller 62, which can send corrective signals 126 to the RF driver 66 or adjust existing amplitude or frequency control signals delivered to the RF driver 66.

One or more AOMs 60 can therefore be used, with or without the frequency control techniques, in a closed-loop system for increasing the pulse amplitude stability at high update rates. Such amplitude or frequency adjustments can be used to control the laser pulse energy for laser drift and/or thermal instabilities in the laser output and/or inconsistent RF-induced heating of the AOM 60. The RF signal applied to the AOM 60 can be modulated to affect the amplitude or energy of any given laser output pulse in response to the information concerning the amplitude or energy of one or more preceding laser output pulses. The amplitude or energy of any given consecutive laser output pulses in a continuous string (such as tens, hundreds, or thousands) of multiple consecutive pulses can be controlled to vary by less than the typical 7% (or greater) pulse-to-pulse energy variation of conventional applicable laser micromachining systems. In some preferred embodiments, the pulse-to-pulse energy variation can be less than about 3% or even less than about 0.5% to 1%. Such pulse-to-pulse energy stability is particularly useful for embodiments employing solid-state harmonic lasers, especially those that are used to generate UV wavelengths.

With the additional benefit of frequency control, pulse amplitude stability can be achieved on a wide variety of time scales, limiting the effects of laser variations in energy caused by various events, such as thermal variations in the laser 64, the AOM 60 itself, or other linear or potentially nonlinear events. A plurality of transducers can also be employed to modulate the same beam axis to increase diffraction efficiency as later described.

Figure 17:
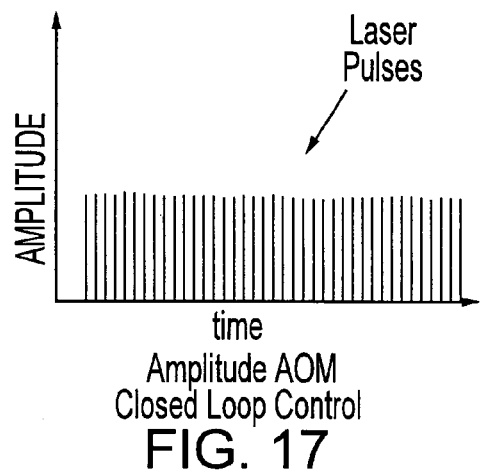
FIG. 17 is a graph of amplitude versus time showing amplitude stability achievable through AOM closed-loop energy control.

FIG. 17 is a graph of amplitude versus time showing exemplary amplitude stability achievable through closed-loop energy control using the AOM 60, such as in the embodiment of laser system 50e shown in FIG. 16. The feedback is used to change the amplitude of the RF power to the AOM 60, thus changing the transferred energy propagating along the higher-order optical path 72a traveling to the workpiece 80.

Figure 18:
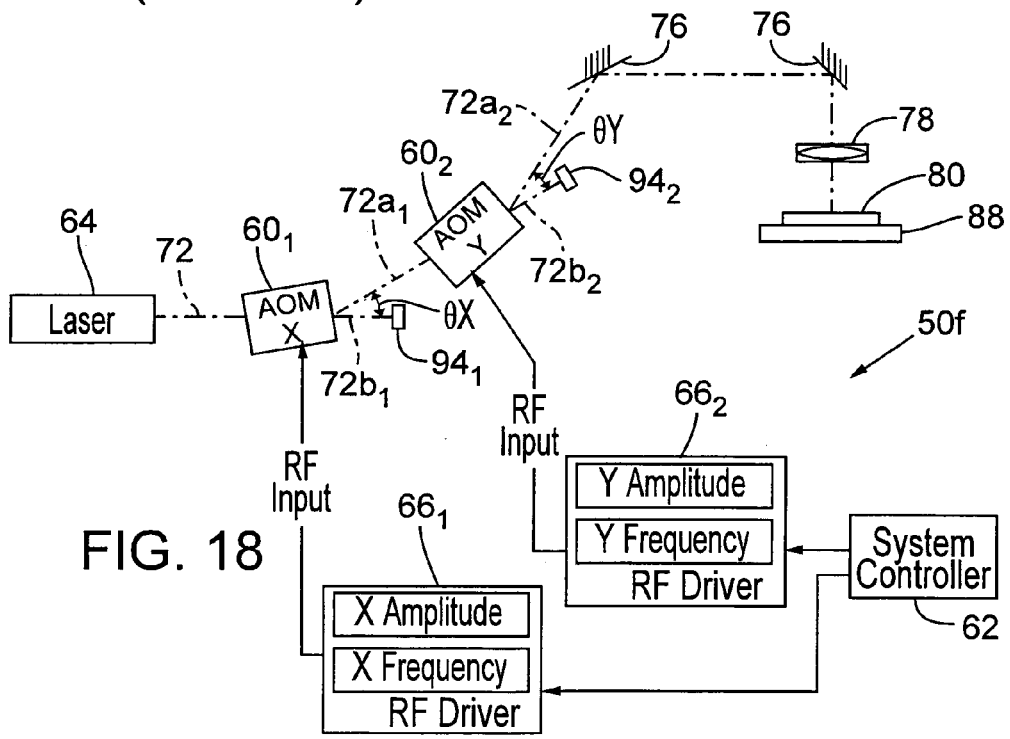
FIG. 18 is a schematic diagram of a laser system employing extracavity AOMs to effect beam positioning.

In another example of AOM applications, FIG. 18 is a schematic diagram of a laser system 50f employing two extracavity AOMs $60_1$ and $60_2$ (generically, AOMs 60) to affect beam positioning on the surface of workpiece 80 in transverse Cartesian axes. In a preferred embodiment, one of the AOMs 60 would control movement along the X axis and the other would control movement along the Y axis, providing a complete range of angular adjustment of the laser beam in X and Y on the surface of the workpiece 80. In FIG. 18, the first AOM $60_1$ is shown modulating in the X axis and the second AOM $60_2$ is shown modulating in the Y axis, but skilled persons will appreciate that the order or positioning could be reversed. Skilled persons will also appreciate that the size of either or both AOMs $60_1$ and $60_2$, and particularly $60_2$, can be increased to permit greater acceptance angles.

AOMs $60_1$ and $60_2$ are preferably driven by separate respective RF drivers $66_1$ and $66_2$ that have the ability to variably control the amplitude and/or the frequency of the RF power delivered to the transducers 70 as in any of the previously described embodiments, so the amplitude and position of the output beam at the workpiece 80 can be accurately controlled. Because the RF driver frequency can be adjusted at very high speeds, the AOMs 60 can be used to steer the beam in real time in an open-loop scanning system with lookup tables of characterized linear effects to calibrate out unwanted position error effects.

Figure 19:
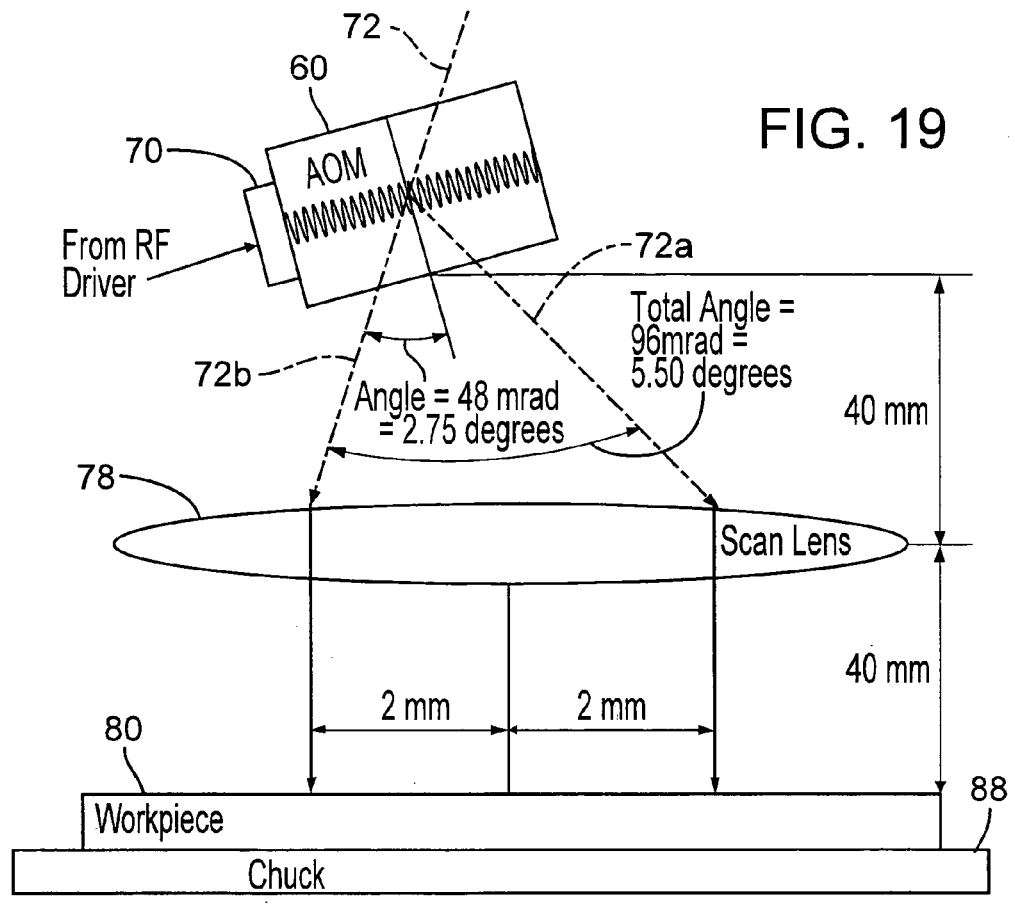
FIG. 19 is a schematic diagram showing an exemplary deflection angle range of an AOM.

FIG. 19 is a schematic diagram showing exemplary positioning and deflection angle range of an exemplary AOM 60 responsive to an RF driver driven up to 50 MHz at 2 W. When the AOM 60 is positioned at an exemplary height of about 40 mm from the focusing lens 78, which is positioned at an exemplary distance of about 40 mm above the workpiece 80, and assuming about a 96 mrad or 5.5 degree total angle of deflection for theta, calculations can be done to show that the effective scan dimensions on the workpiece 80 yield at least a 4 mm scan field in X and/or Y.

With respect to the angular resolution, in one embodiment, the output of a DDS driver for the RF power can be set in very small increments of 1 Hz, allowing for a theoretical resolution set by the following equation:

$$\theta = \frac{\lambda}{2v_s} f \quad (1)$$

For example, using a wavelength of 355 nm and an acoustic velocity of 650 m/s, the angular change relating to a 1 Hz frequency change of the acoustic wave is 2.73 E-10 degrees. However such resolution might be impractical due to the mechanical limitations of the system to actually resolve the frequency. So in some embodiments, a range of values for control can be specified by minimum resolution of steps of 4.1 E-6 degrees or the equivalent of 0.72 micro radians, which is equivalent to a 15 KHz step size in frequency. An exemplary AOM optical scanning system having an angular setting of about 50 milliradians, would provide 69,444 steps of angular resolution.

The bandwidth of the AOM 60 is primarily affected by three items: the maximum speed available from the electronic devices to generate a new frequency, such as the RF drivers 66; the ability of the AOM transducer 70 to create a vibration of the new frequency; and the time it takes for the new sound wave to be created in the AOM 60. Generally, this third item concerning the formation of a new sound wave takes the most time and thus dominates the scanning bandwidth.

One equation relating the angle corresponding to a particular frequency can be expressed as:

$$\theta = \sin^{-1}\left(\frac{\lambda}{2\Lambda}\right) = \sin^{-1}\left(\frac{f\lambda}{2v_s}\right) \approx \frac{\lambda}{2v_s} f \quad (2)$$

where $v_s$ is the speed of sound in the medium.

The bandwidth, B, can then be given as:

$$B = \frac{v_s}{D} \quad (3)$$

where D is the width of the laser beam through the AOM 60.
For a common AOM 60, the parameters might be:
Material: Fused quartz (n=1.46, $v_s$=6 km/s);
Sound: Frequency f=100 MHz;
Light: 1047 nm wavelength; and
Laser beam diameter: 12 mm.

Using these parameters, one exemplary AOM 60 in a scanning system would have bandwidth of up to about 500 kHz at an acceptable angle. In contradistinction, a typical galvanometer bandwidth is about 4 kHz and with a fast steering mirror can be upwards of about 12 kHz. The primary limitations of a galvanometer scanner is the inertia created by moving a mass and the resonance of the movement. An AOM 60 does not incur such mass-related effects, so its bandwidth can be up to 100 times greater.

Figure 20:
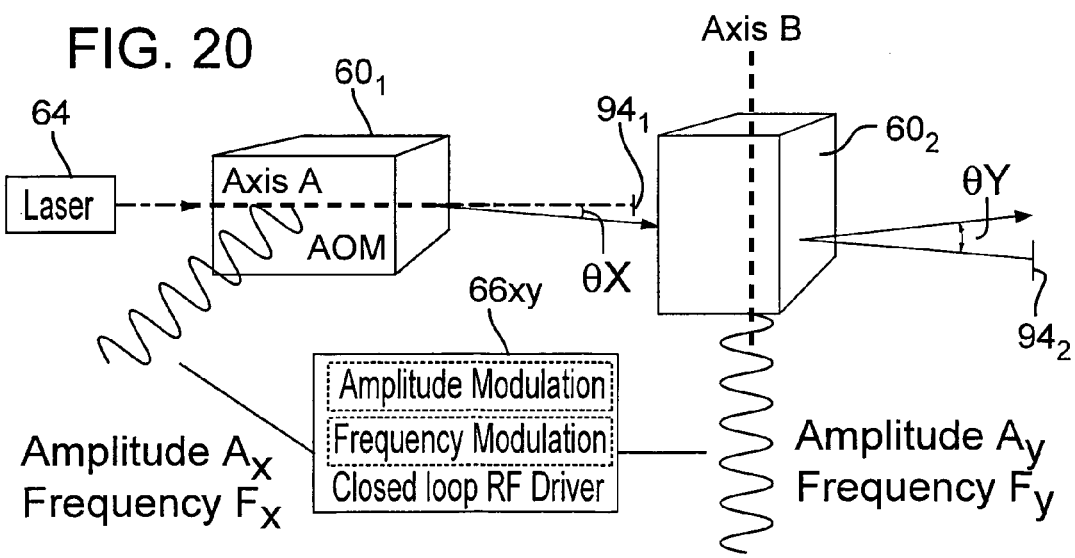
FIG. 20 is a schematic diagram showing an AOM scanning system employing AOMs in series to effect beam positioning in two axes.

FIG. 20 is a schematic diagram showing an embodiment of AOMs $60_1$ and $60_2$ of FIG. 18 in greater detail, with the AOMs 60 aligned along different axes to provide a dual-axis scanning system. The AOM $60_1$ is set in position with the axis A perpendicular to the axis A of the AOM $60_2$. Therefore, changing the frequency of the drive signal to AOM $60_1$ will change the output angle of the AOM $60_1$ in the X axis, with the relationship that varying frequency will vary the exit angle theta X. Changing the frequency of the drive signal to AOM $60_2$ will change the exit angle of the AOM $60_2$ in the Y axis, with the relationship that varying frequency will vary the theta Y. AOMs $60_1$ and $60_2$ can be close together and modulated independently, with the same or different frequencies and amplitudes. Thus, the output beam can change in amplitude and can move in the X and Y axis directions. The size and shape of the beam dumps $94_1$ and $94_2$ can be adapted to accommodate the desired scan field and prevent the propagation of unwanted light to the workpiece 80.

Figure 20A:
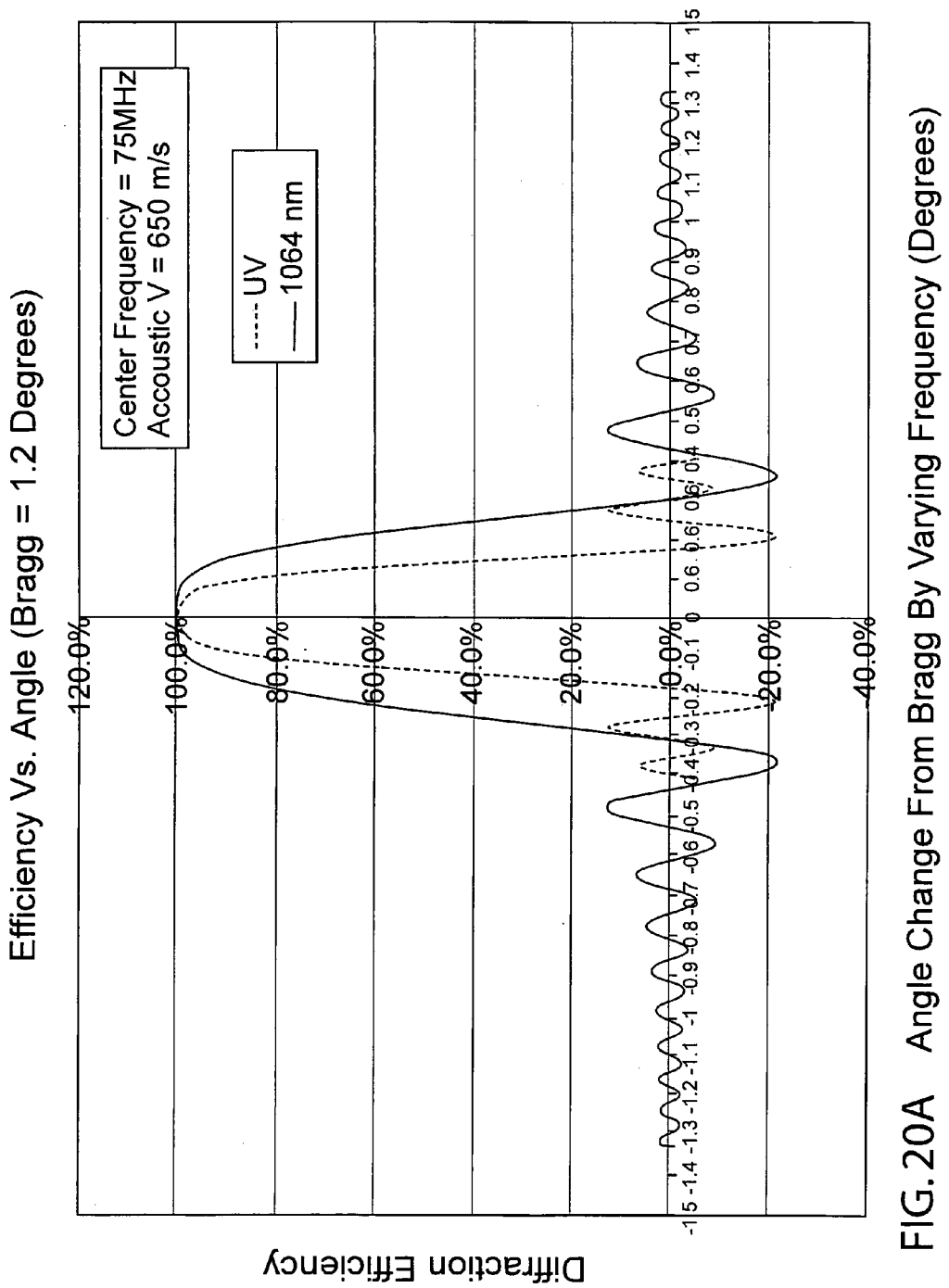
FIG. 20A provides a graph of scanning angle diffraction efficiency versus angle change from a particular Bragg angle for exemplary UV and IR wavelengths.

FIG. 20A provides a graph of scanning angle diffraction efficiency versus angle change from a particular Bragg angle at exemplary UV and IR wavelengths. An equation for finding the diffraction efficiency of an AOM may be expressed as:

$$\frac{I_0}{I_1} = \eta \mathrm{sinc}^2 \sqrt{\eta + \frac{\Delta \Phi^2}{4}} \quad (4)$$

where the material properties can be described by $$\eta = \frac{\pi^2}{2\lambda} M \frac{L}{H} P \quad (5)$$

where λ is the light wavelength, M is the figure of merit of the material, L is the length of the transducer interaction zone, H is the height of the transducer 70 and P is the RF power applied. The change due to frequency modulation of the signal can be described by ΔΦ as expressed as:

$$\Delta \Phi = \frac{\pi \lambda}{v} \frac{\Delta f}{2} \frac{L}{\Lambda_0} \quad (6)$$

where v is the acoustic velocity sound in the material, Δf is the frequency change for modulation, L is the interaction length, and $\Lambda_0$ is the wavelength of the sound in the material. Substituting equations (5) and (6) into equation (4) will result in the diffraction efficiency for a particular Bragg Angle for a change in frequency. The diffraction efficiency is shown for an example in which an initial frequency of 75 MHz that produces a Bragg angle of 1.2 degrees at a UV wavelength of 355 nm is changed by ±14 MHz (about a ±0.175 degree scanning angle change for the UV wavelength). So, for example, to keep above 80% diffraction efficiency, one might employ an available scan angle change of ±0.1 degree.

The diffraction efficiency at 1064 nm is also shown, indicating that as the wavelength decreases, the allowable scan angle decreases. The usable "scan angle" area can be defined by the minimum diffraction efficiency that the system can withstand in terms of the laser power processing window. If there is a large process window, then the system has more of a laser overhead power budget to allow larger scan angles.

With reference again to FIGS. 18–20, if one or more additional AOMs 60 (or other movable devices such as FSMs) are placed in front of the scanning AOMs 60₁ and/or AOM 60₂ for the respective axes, the incoming Bragg angle condition can be moved to provide a secondary Bragg angle or plurality of Bragg angles that can be selected to increase the scanning range of the scanning AOM 60.

Figure 20B:
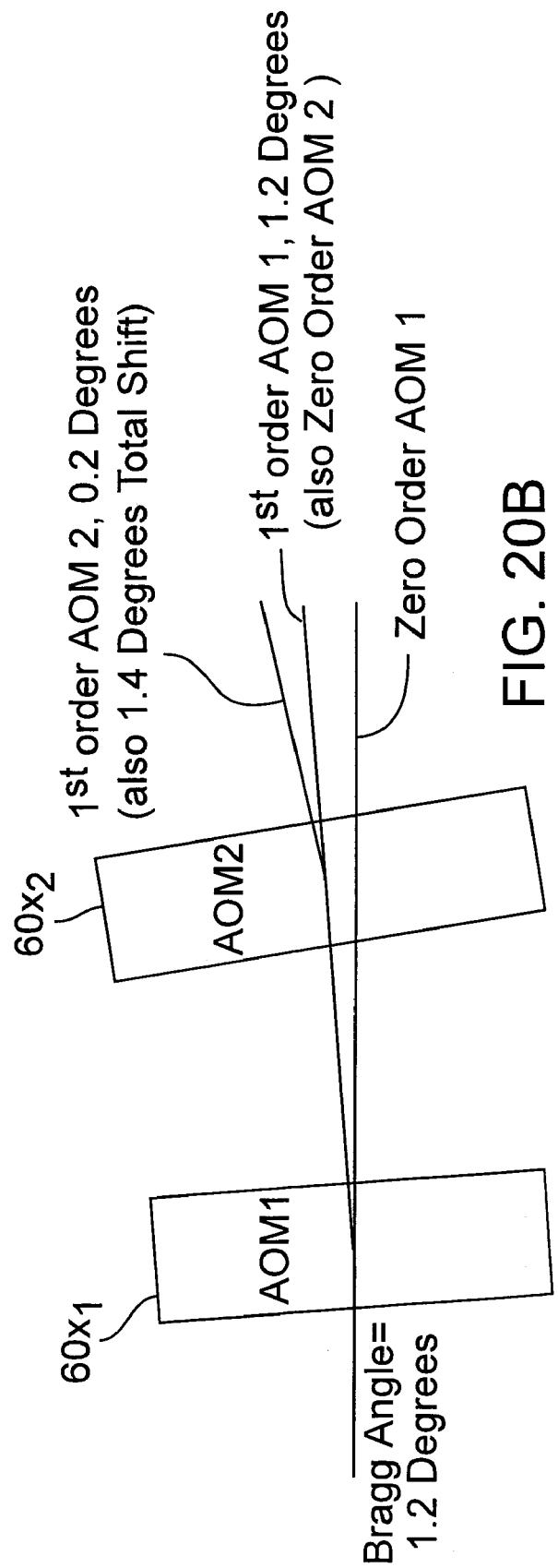
FIG. 20B is a schematic diagram showing an AOM scanning system employing AOMs in series to expand beam-positioning range in a given axis.

FIG. 20B is a schematic diagram showing an AOM scanning system employing AOMs 60x₁ and 60x₂ in series to expand beam-positioning range within a given Cartesian or workpiece axis. With reference to FIG. 20B, the upstream AOM 60x₁ can be positioned (preferably at its Bragg angle) along beam path 72 such that its zero-order output achieves the Bragg Angle for the downstream AOM 60x₂. The first-order output of the upstream AOM 60x₁ can then be set for a second Bragg angle on the downstream AOM 60x₂. This expansion of beam-positioning range can also be accomplished with an AOM 60₃ having multiple transducers as shown and described later with respect to FIG. 23C instead of using separate AOMs 60x₁ and 60x₂.

Figure 20C:
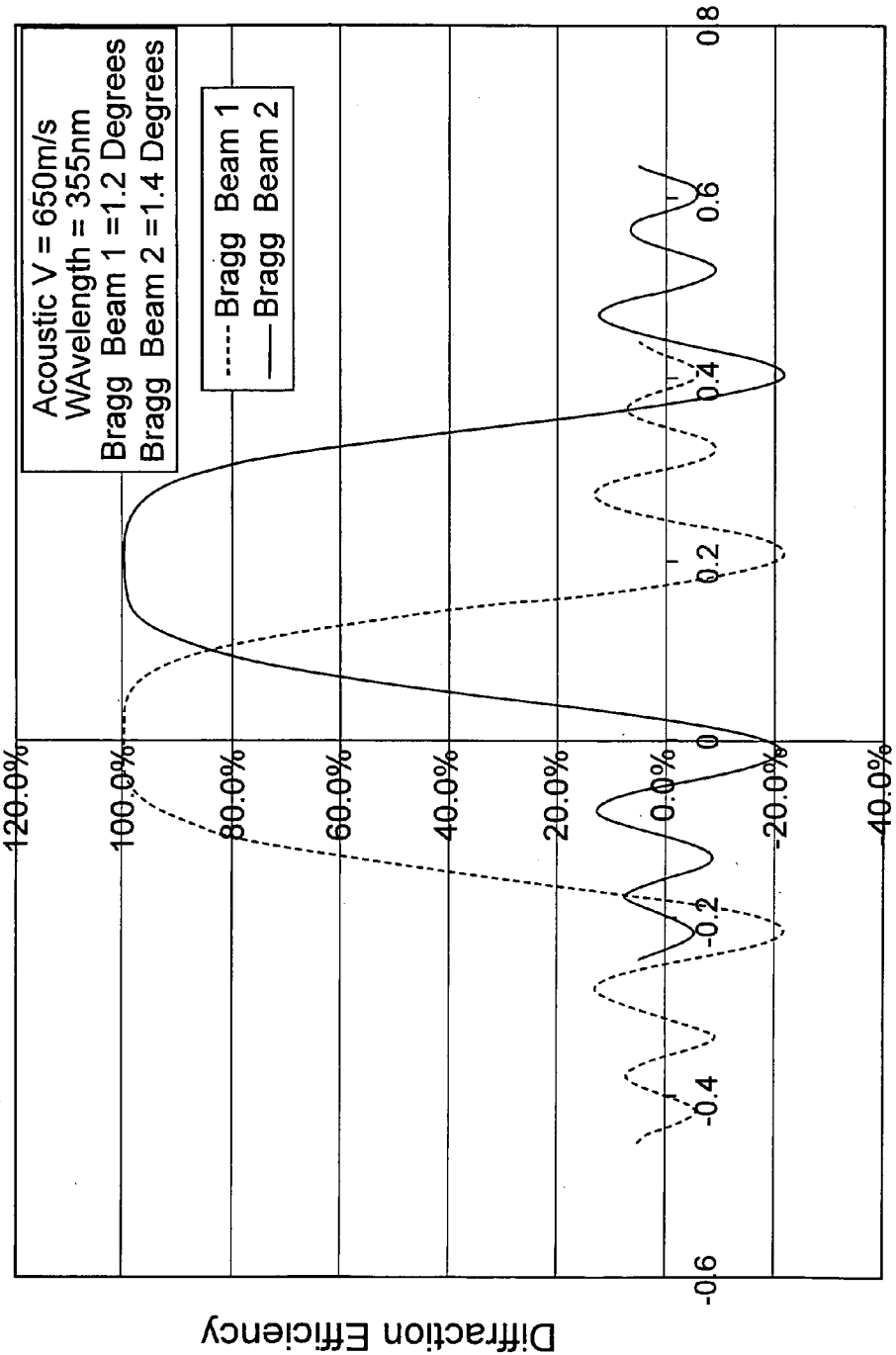
FIG. 20C provides a graph of scanning angle diffraction efficiency versus angle change resulting from serial same axis-modulating AOMs 60 at exemplary UV and IR wavelengths.

In one example, the upstream AOM 60x₁ shifts the first-order beam by 1.2 degrees and the downstream AOM 60x₂ shifts that incoming beam by an additional 0.2 degree without great loss in efficiency. FIG. 20C provides a graph of scanning angle diffraction efficiency versus angle change resulting from serial same axis-modulating AOMs 60 at exemplary UV and IR wavelengths. With reference to FIGS. 18–20C, employing serial AOMs 60 for modulating the same axis can extend the scan angle of the downstream AOM 60x₂ as determined by the extent of scan angle of the upstream AOM 60x, or other device. An AOM 60x, as the upstream Bragg adjustment device can provide a larger scan angle than using a single AOM 60 alone and can be accomplished at a bandwidth higher than most laser repetition rates, i.e., greater than 100 kHz. Skilled persons will appreciate that even small AOM scanning range improvements will be particularly beneficial at UV wavelengths where the Bragg efficiency factors can be somewhat limiting.

A slower device, such as an FSM or galvanometer system, as the upstream Bragg adjustment device can extend the scan angle of the downstream AOM 60x₂ even more greatly, but the overall speed performance is limited by the bandwidth of such upstream positioner. Such slower upstream Bragg adjustment devices would nevertheless be useful, especially for making angle shifts to compensate for slow offsets in laser beam positioning that cause the Bragg efficiency to drop. For example, if a downstream AOM 60x₂ is used to correct for instabilities in the laser optics system which are causing the laser beam slope through the focusing lens 78 to be slightly off, causing an accuracy problem on exemplary link cutting systems. Such small correction can be very fast with the AOM 60x₂, almost eliminating pointing drift from small thermal and other effects. However, after a few days, or potentially weeks, the offset from the beginning calibration can be significant in terms of angle of incidence on the entrance surface of the AOM 60x₂, causing a loss in efficiency through the AOM 60x₂. One solution to this problem would to include a slower upstream Bragg adjustment device (where a larger but adjustment angle might be warranted or slower adjustment time might be sufficient) to be able to adjust (or calibrate) the incoming beam to adjust for the exact Bragg condition of the AOM 60x₂, allowing for maximization of efficiency through it. Without such AOM 60x₁ slower upstream Bragg adjustment device before the AOM 60x₂, then calibration might necessitate fine positioning the device by hand (or potentially with a mechanical stage under the AOM 60x₂ that is movable by hand or electronic means).

Skilled persons will appreciate that the upstream Bragg adjustment device can be variably controlled over a large range or can just be used as a switch between two or more specific angles that satisfy sufficiently efficient Bragg angles of the downstream AOM 60x₂. A third serial AOM 60 (or other beam adjustment device, not shown) may also be employed to correct for movement of the pupil when shifting between two Bragg conditions. Skilled persons will also appreciate that serial same-axis AOMs 60 (or other upstream Bragg adjustment devices) can be employed to improve the scan range along either axis or both axes of an AOM scanning system. Skilled persons will further appreciate that, as later described, the amplitude of the RF signal applied to the transducer(s) 70 can be adjusted to compensate for deviation from Bragg efficiency resulting from a shift of the exit angle in either of the AOMs 60x₁ or 60x₂.

Figure 21:
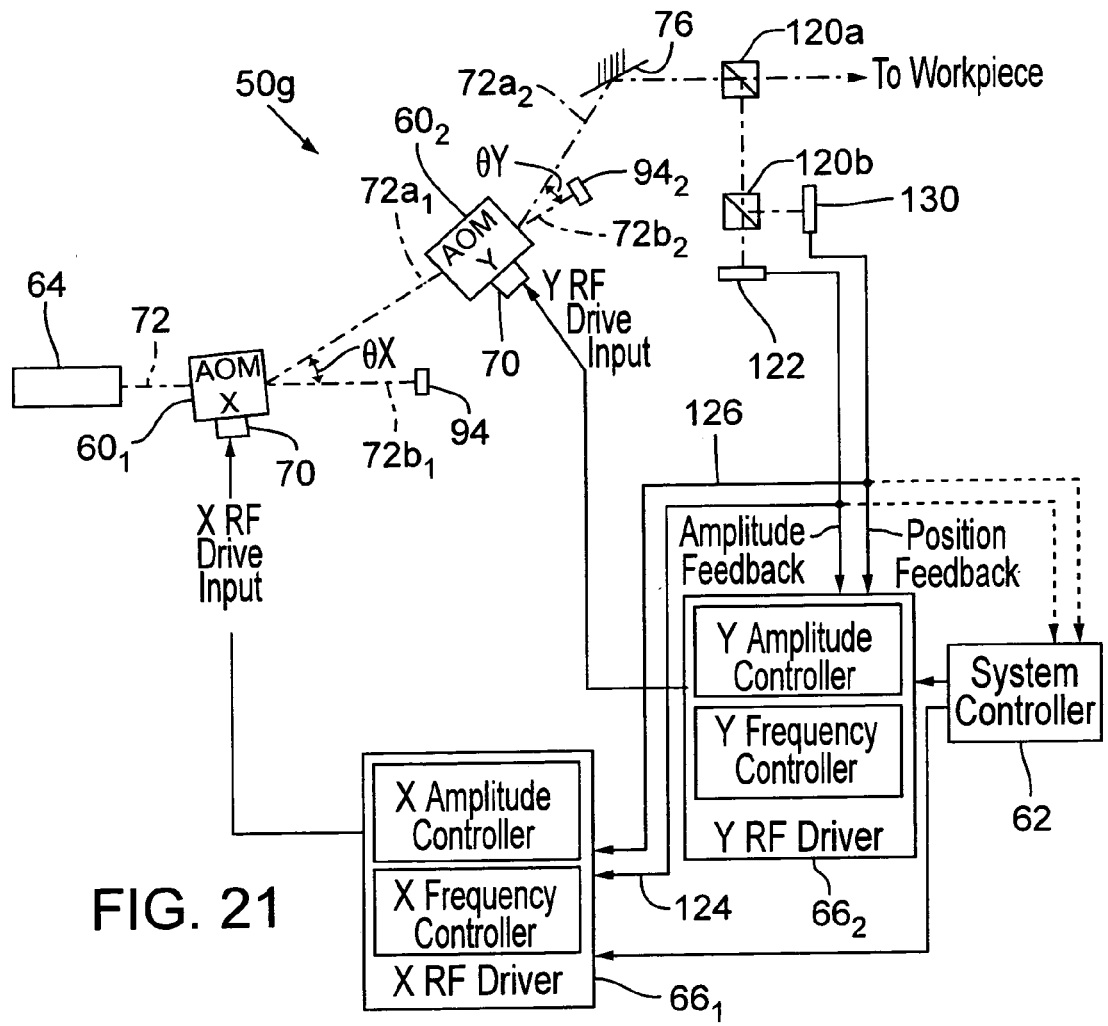
FIG. 21 is a schematic diagram of a laser system employing extracavity AOMs and closed-loop correction control to affect beam positioning.

FIG. 21 is a schematic diagram of a laser system 50g employing extracavity AOMs 60₁ and 60₂, two beam-splitting optical elements 120a and 120b, an energy and amplitude detector 122, and a position-sensing detector 130 to provide closed-loop control of pulse energy, amplitude, and laser beam position at the surface of the workpiece 80. Beam alignment can be critical to the outcome of many processing operations, especially when submicron accuracy is desired. Beam alignment can be affected by a variety of factors such as mechanical motion, vibration or thermal variations in any of the optical media, and/or other beam walk contributors. Closed-loop AOM beam-positioning control can reduce beam misalignments and product loss caused by such factors.

In implementing angular corrections using frequency control of the AOM RF power, diffraction efficiency of the first-order beam will be less as the angle is higher or lower than the angle accepting of the Bragg condition. The angle defined by the Bragg condition is stated as:

$$\mathrm{Sin}\theta_B = \frac{\lambda}{2\Lambda} \quad (7)$$

where $\theta_B$ is the angle of incidence of the incoming light, $\lambda$ is the wavelength of light, and $\Lambda$ is the wavelength of sound in the AOM medium.

If the frequency of the transducer 70 is modified, the wavelength of the sound wave will be modified, causing the Bragg angle that satisfies the Bragg equation to change. In this case, the reflectance or the efficiency of the diffraction will drop off with a relationship equivalent to:

$$R_e = \mathrm{sinc}\left[(\sin\theta - \sin\theta_B)\frac{2L}{\lambda}\right] \quad (8)$$

where L is the length of interaction of the sound and light (or the diameter of the light beam).

This *sinc* function can limit the angle usable in a laser machining operation, as high efficiencies are typically required for processing. However, a laser power or energy overbudget can be implemented to account for the efficiency drop during angle control, as well as for harmonizing energy or amplitude of the system.

For example, employing TeO$_2$ AOM crystal, operating at 60–80 MHz with greater than 2 W RF power and acoustic velocity of 650 m/s on a 1064 nm laser with a 2 mm beam diameter, provides a maximum allowable angle of approximately 50 milliradians before zero efficiency is diffracted to the first-order beam.

In a laser beam correcting application to correct for transients in the optical system, for example, an angle range of at least ±0.5 milliradian is desirable. If the efficiency of the AOM 60 at the Bragg condition is 80%, then a deviation from the Bragg condition will result in an efficiency loss on the first-order beam of approximately 0.8%, or a new first-order diffraction efficiency of 79.2%.

In such case, the laser power budget to allow for some additional laser energy can be implemented to allow for this extra loss due to angular correction as well as for amplitude correction for laser transients, thermal effects, or other disturbances in the optics train. Accordingly, the RF power to the AOM 60 can be set to a lower level at the Bragg condition to have the maximum laser energy output of E$_{max}$; a possible number is the equivalent energy of 75% efficiency for this example. Thus, a total control budget of 5% efficiency can be available to use for amplitude adjustments and angular corrections. As the angle is adjusted to +0.5 milliradian from the Bragg condition, the efficiency will drop to 79.2%, but the RF amplitude can be increased by 0.8% to offset the reduced efficiency due to the angular correction. In this example, 4.4% more overhead room would still be available for other amplitude corrections that may be desirable.

Thus, the amplitude of the RF signal applied to the transducer 70 can be adjusted to compensate for deviation from Bragg efficiency resulting from a shift of the exit angle, from a beam path 72 at the Bragg angle that would impinge a nominal beam position to a positioned angle that directs the beam path 72 to impinge a desired beam position that is offset from the nominal beam position. The Bragg efficiency amplitude compensation information may be mathematically and/or experimentally determined for each AOM 60 of specified characteristics. The compensation data may be placed into a lookup table or be provided by an algorithm, such as an algorithm based on a *sinc* function. The Bragg efficiency amplitude compensation information may be implemented at the RF driver 66 from the laser system controller 62 or from an intermediate controller or separate controller.

Bragg efficiency compensation can be implemented for either or both of the AOMs 60$_1$ and 60$_2$ to affect amplitude correction on the respective X and Y axes on the surface of the workpiece 80. Similarly, Bragg efficiency compensation can be implemented for either or both of the transversely or orthogonally positioned transducers 70$x$ and 70$y$ (FIG. 24), as later described.

With reference again to FIG. 21, signals from the amplitude detector 122 and the position-sensing detector 130 can be fed to the laser system controller 62 and/or directly or indirectly to the X and Y RF drivers 66$_1$ and 66$_2$. In some alternative embodiments, beam-splitting elements 120 and position-sensing detectors 130 can be employed after each AOM 60. Beam-splitting elements 120 may even be attached directly to the output surfaces of one or both of the AOMs 60.

The methods of feedback for these feedback control systems vary from capacitance detection of mechanical rotation to position-sensing electronics for detecting laser spots. The electronics of the position-sensing detector(s) 130 might be the limiting factor for AOM performance in terms of being able to accurately detect the angular position of the AOMs 60. Therefore, alternative closed-loop system components and techniques known to skilled practitioners can be employed.

The bandwidth of the position-sensing detector(s) 130 in the closed-loop control systems may preferably employ filtering techniques to enhance position accuracy by reducing the noise from the electronics. If the desired accuracy is extremely high, very high noise reduction can be employed, but the bandwidth of the position-sensing detector(s) 130 may be limited due to filtering.

The coefficients of the control system can be updated at a rate that is greater than the overall system bandwidth desired, but not on every cycle of the AOM update. This update parameter can be set depending on the desired accuracy and the desired bandwidth of the system. An exemplary system may have the following parameters:

AOM bandwidth=250 kHz;
Desired system bandwidth=25 kHz; and
Position-sensing bandwidth (after filtering)=250 Hz.

The AOM control parameters would be then updated every 100 cycles of the system, allowing for detection of transients of up to 250 Hz to be controlled and also giving an overall system performance of 25 kHz. Thus, in cooperation with the very fast frequency updating and adjustment speeds of the AOMs $60_1$ and $60_2$ by any of the techniques previously described, the closed-loop control system is able to make slight adjustments in alignment on-the-fly in real time.

FIG. 22 is a schematic diagram of an AOM $60_3$ employing at least two transducers 70A and 70B (generically transducers 70) having overlapping transducer modulation zones 116 to allow for selection of the direction of the propagating sound wave through the medium of the AOM 60. Transducer 70A will produce a frequency downshifted reflection of light along path 72B, and transducer 70B will produce a frequency upshifted reflection of light along path 72B as well. When used at the same frequency, and preferably phase locked, the addition of these transducer signals can produce small magnitude gains in efficiency of the diffracted light. Estimated efficiency gains may range from about 1% to greater than or equal to about 15%, depending on wavelengths and other typical laser parameters.

Only one of the transducers 70A and 70B may be activated at a given time, or both the transducers 70A and 70B may be activated at a given time. Skilled persons will appreciate that each transducer 70 can be driven by the same or different RF drivers 66 (not shown) at the same or different frequencies in accordance with any of the previously described AOM modulation techniques or embodiments. If transducers 70A and 70B are operated at different frequencies, there is the potential to cause multiple diffractions in the device, allowing for the formation of two separate beams, separated by the angle defined by the difference in frequency. Transducers 70A and 70B may also be operated concurrently at slightly different phases to increase scan angle resolution beyond that available to a single transducer 70 alone. At least two or more transducers 70A and 70B can also or alternatively be positioned on the same surface of AOM $60_3$ to achieve similar advantages. These embodiments can be applied to AOMs 60 oriented for either axis.

If transducers 70A and 70B have different sizes, they can potentially allow for different frequency drivers that would permit one of the transducers 70 to produce a higher frequency than the other. With reference again to equation (7), the Bragg angle can be increased by increasing the acoustic frequency of either of the transducers 70A and 70B. Traditional transducers 70 are in the range of 50 MHz to 250 MHz for Bragg angles of 0.7 degrees to 4 degrees. Frequencies greater than 250 MHz typically require smaller transducers and RF power generators with the capability to drive them at higher frequencies. Using the smaller of the two transducers 70A or 70B when desirable would allow for formation of a larger Bragg angle for the incoming beam (and, therefore, allows for a larger first-order exit angle), potentially making the separation from the zero order larger (and placement of beam dump 94 easier) and thus making propagation of the first-order beam to the workpiece 80 easier. Using the larger of the two transducers 70A or 70B when desirable would allow for greater diffraction efficiency whenever the larger Bragg angle is not desired. Similarly, two smaller frequency and phase-locked transducers 70A and 70B could be employed to expand the diffraction efficiency over a single smaller transducer 70 where applications or system constraints require the larger Bragg angle. Such embodiments would add greater versatility to the AOM scanning system.

Figure 22A:
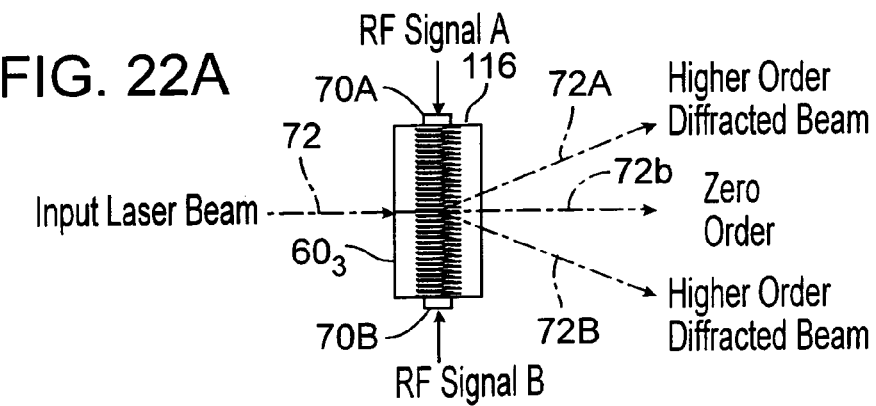
FIG. 22A is a schematic diagram of an AOM employing at least two transducers to divert a beam that is perpendicular to the AOM entrance surface.

FIG. 22A is a schematic diagram of an AOM $60_3$ employing at least two transducers 70A and 70B to allow for selection of the direction of the propagating sound wave through the medium of the AOM 60 to divert a beam that is perpendicular to the AOM entrance surface. As discussed in connection with FIG. 22, this embodiment may be employed to increase diffraction efficiency, increase diffraction angle range by providing a higher combined frequency, or increase versatility by employing transducers 70 of different sizes. Skilled persons may also note that when the input beam 72 is closer to either of the transducers 70, the response time of the AOM $60_3$ may be slightly increased.

Figure 23A:
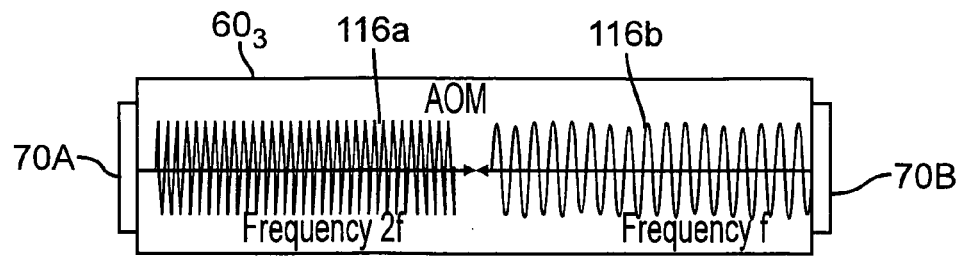
FIGS. 23A and 23B are schematic diagrams demonstrating effects of at least two transducers propagating different frequencies on an AOM along the same axis.
Figure 23B:
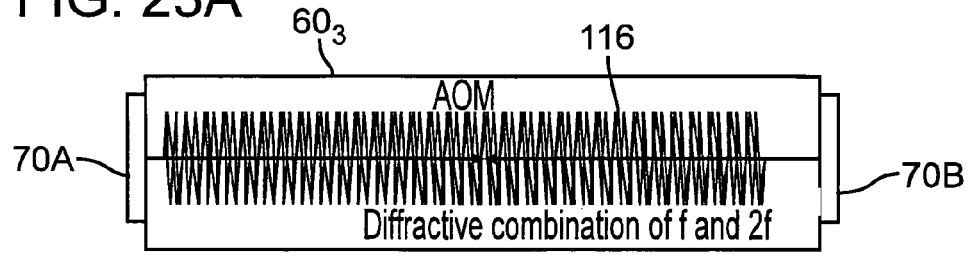

FIGS. 23A and 23B are schematic diagrams demonstrating effects of at least two transducers 70A and 70B propagating different frequencies on the AOM 60 within overlapping transducer modulation zones 116. FIG. 23A shows exemplary different frequencies propagating through the AOM 60 when the transducers 70A and 70B are "ON" contemporaneously, and FIG. 23B shows the potential to create diffraction inside the AOM 60 that is the combination of the two sources.

In certain exemplary cases, such as when both of the transducers 70 are "ON" and the first transducer 70A provides twice the frequency of the second transducer 70B, the diffractive combination of the two frequencies in the medium of the AOM 60 can be beyond the frequency limitations of the independent AOM RF drivers 66 to create on their own and beyond the frequency limitations of either of the transducers 70 to create on their own (due to mechanical limitations of the transducer and electrical limitations of the RF power amplifier). Such frequency combinations can lead to achieving higher angular beam-positioning resolution or higher Bragg angles than are available to embodiments employing single RF drivers 66 that drive single transducers 70. Skilled persons will also appreciate that for some embodiments, the transducers 70 may be positioned so that the transducer modulation zones 116 are parallel instead of overlapping. In such embodiments, the transducers 70 may be placed so that they are both on the same surface or on opposite surfaces.

At least two or more transducers 70A and 70B can also be used to diffract multiple wavelengths from the same beam. With reference again to FIG. 22, the incoming laser beam 72 may contain multiple wavelengths, such as when harmonics are generated by the laser 64. For example, if the laser beam 72 has a wavelength of 355 nm generated from 1064 nm using third harmonic generation techniques, the laser beam 72 can contain energy from 710 nm as well as 355 nm. In such case, the AOM $60_3$ may act as a wavelength selector, only allowing the specific wavelength satisfying the Bragg equation (7). Therefore, if the selected frequency on the first transducer 70A is set to a frequency resulting in the Bragg diffraction of 355 nm wavelength, the 710 nm portion of the beam will not diffract and will travel the zero-order path 72A. Skilled persons will appreciate that the use of a laser output having multiple selected wavelengths is beneficial to some laser applications, so a method of having both wavelengths travel to the work surface may be desirable. So in addition to setting the first transducer 70A to satisfy the Bragg equation for the first wavelength, a skilled person can set the second transducer 70B to satisfy the Bragg equation for the second wavelength, propagating both wavelengths in the first-order path 72B.

FIG. 23C is a schematic diagram demonstrating the effects of at least two transducers 70 positioned at different angles with respect to each other to expand beam-positioning range in a single Cartesian axis. With reference to FIGS. 20–20C and 23A–23C, the second transducer 70B is positioned at a tilt angle 132 with respect to the first transducer 70A such that their respective transducer modulation zones 116b and 116a are nonparallel with each other but traverse the beam path 72 in the same plane such that they modulate the exit or deflection angle in the same Cartesian axis. The transducers 70A and 70B are preferably positioned such that their respective transducer modulation zones 116a and 116b are non-overlapping, but overlap is permissible and may be desirable in some circumstances.

Skilled persons will appreciate that the second transducer 70B may alternatively be positioned on the opposite transducer surface 138 if provided with the appropriate tilt angle 132. However, the tilt angle 132 of the second transducer 70B can be selected so the diffracted order of the second transducer 70B is offset from the diffracted order of the first transducer 70A to allow the placement of the transducers in close proximity along the same side of the AOM $60_3$.

In some preferred embodiments, the first transducer modulation zone 116a is parallel to the beam entrance surface 52, and the second transducer modulation zone 116b is parallel to the beam exit surface 54, such that the beam entrance surface 52 and the beam exit surface 54 are nonparallel. In other preferred embodiments, one of the transducer modulation zones 116 is parallel to the beam entrance surface 52 and the beam exit surface 54 such that the beam entrance surface 52 and the beam exit surface 54 are parallel. In yet other preferred embodiments, one of the transducer modulation zones 116 is parallel to the beam entrance surface 52, and the beam exit surface 54 may be at an angle that is an average of 90 degrees and 90 degrees ±the tilt angle 132 or may be at some other angle between 90 degrees and 90 degrees ±the tilt angle 132. Alternatively, the beam entrance surface 52 may be angled with respect to the first transducer modulation zone 116a, and the beam exit surface 54 may be parallel to the second transducer modulation zone 116b.

The AOM $60_3$ may be angle cut to provide the tilt angle 132 for the second transducer 70B by broaching or milling the transducer surface 136b or neighboring surface 136a to the desired angle, depending on the AOM material. These techniques are known in the optical material/device industry along with other techniques to achieve precision surfaces. Although the transducer surface 136b is shown to extend outwardly from the transducer surface 136a, skilled persons will appreciate that the transducer surface 136b would function properly if it extended inwardly by the same tilt angle 132.

In most embodiments, the tilt angle 132 is a small angle typically no greater than 5 degrees, and preferably less than about 2.5–3 degrees. In most embodiments, the tilt angle 132 is typically greater than about 0.1 degree, and preferably greater than 0.3 degree or 0.5 degree. FIG. 23C depicts an exemplary tilt angle 132 of about 1 degree.

The AOM $60_3$ is preferably positioned on the beam path 72 such that the beam path 72 impinges the AOM $60_3$ at an entrance angle 114 or 114a that is at or in proximity to a Bragg angle with respect to the beam entrance surface 52 or the first transducer modulation zone 116a. Skilled persons will appreciate that the frequency of the RF signal applied to the first transducer 70A can be adjusted or calibrated to compensate for slight unintentional deviation in alignment.

Whenever scanning is desired along the beam path 72a, or its associated scan range 134a, (down to a minimum desirable Bragg efficiency), the first transducer 70A is activated by an RF signal at a frequency that satisfies or approximately satisfies the Bragg condition such that the beam path 72 is deflected to a desired exit angle 118a, within the scan range $134a_1$ such that the beam path $72a_1$ impinges the workpiece 80 at a desired beam position 142 (FIG. 27) that is shifted from its nominal or original beam position. The frequency of the RF signal applied to the first transducer 70A would be adjusted to determine the desired exit angle 118a, within the scan range $134a_1$, and the amplitude of the RF signal applied to the first transducer 70A could also be adjusted to a desired amplitude to control beam power or energy. Furthermore, whenever scanning is desired along the beam path $72a_1$ or its associated scan range $134a_1$, preferably, no RF signal is applied to the second transducer 70B so that the second transducer modulation zone 116b generally does not affect the exit angle $118a_1$ of the beam path $72a_1$. In some embodiments, however, it may be desirable to set the tilt angle 132 so that the first-order or higher-order beam path created by the second transducer 70B is aligned with the beam path $72a_1$, in which case the second transducer 70B would be driven at full amplitude and at an RF frequency to match the Bragg condition.

Whenever scanning is desired beyond the scan range $134a_1$ and within a scan range $134a_2$ that results from the cooperative contemporaneous operation of the transducers 70A and 70B, the transducers 70A and 70B are activated by respective RF signals at respective frequencies that satisfy or approximately satisfy their Bragg conditions such that the beam path 72 is deflected to a desired exit angle $118a_2$ within the scan range $134a_2$ such that the beam path $72a_2$ propagates at a cooperative deflection angle (or cooperative deflection propagation direction) $128a_2$ to impinge the workpiece 80 at a desired beam position 142 that is beyond the scan range $134a_1$. The frequency of the RF signal applied to the second transducer 70B would be adjusted to determine the desired exit angle $118a_2$ within the scan range $134a_2$. In some preferred embodiments, the second transducer 70B would be driven at full amplitude, and the amplitude of the RF signal applied to the first transducer 70A could be adjusted to a desired amplitude to control beam power or energy.

Although in some preferred embodiments the transducers 70A and 70B may be identical and driven by identical variably controllable RF drivers 66 as previously discussed, in some preferred embodiments the transducers 70A and 70B and their associated RF drivers 66 may have different operating characteristics or parameters. In particular, in some preferred embodiments, the first transducer 70A may have a smaller size and operate at a higher frequency than the second transducer 70B such that the first transducer modulation zone 116a could provide a larger Bragg angle range than the second transducer modulation zone 116b.

Although the scan angle ranges $134a_1$ and $134a_2$ may range down to 0% Bragg efficiency, exemplary scan ranges 134 are used only down to 20% Bragg efficiency, or down to 50% Bragg efficiency, or down to 80% Bragg efficiency (as roughly depicted in FIG. 23C). In one example, as depicted in FIG. 23C, the incoming Bragg condition is 1.2 degrees for the first transducer 70A, and the incoming Bragg condition is 0.2 degree for the second transducer 70B, as depicted by respective beam paths $72a_1$ and $72a_2$.

Figure 23D:
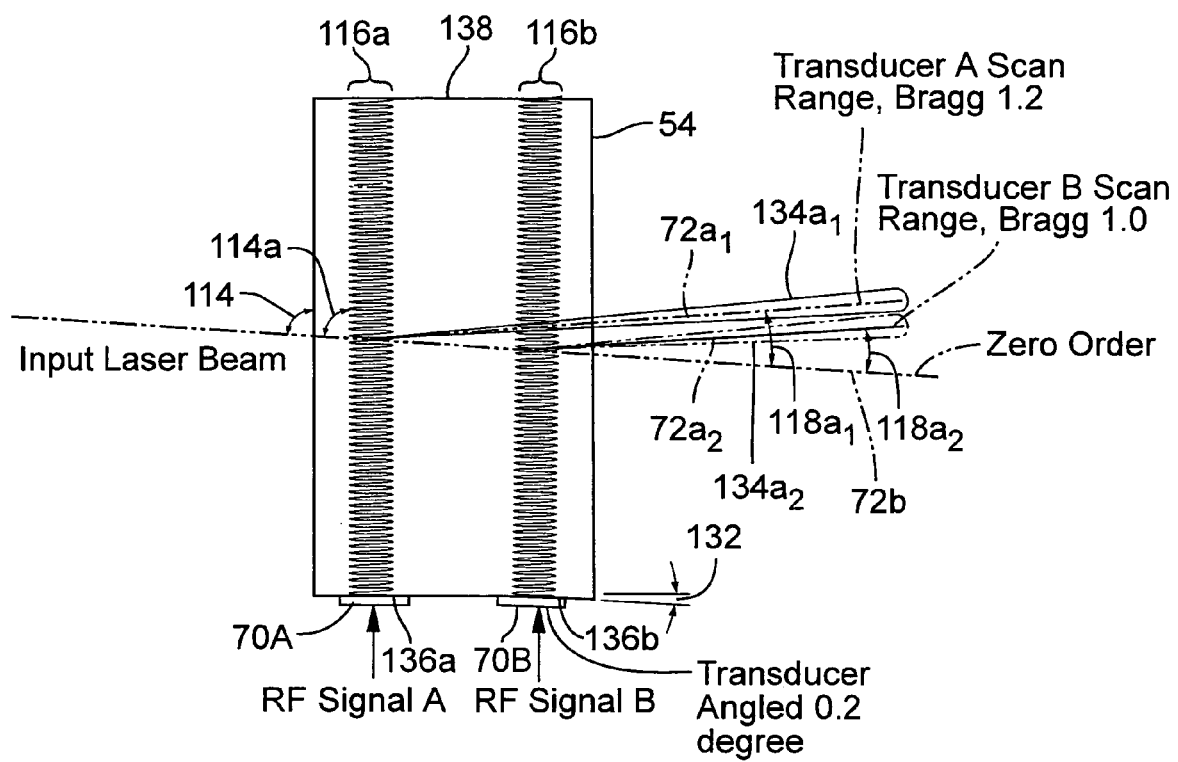
FIG. 23D is a schematic diagram of an alternative embodiment demonstrating the effects of having two transducers positioned at different angles to each other to expand beam-positioning range.

FIG. 23D is a schematic diagram of an alternative embodiment demonstrating the effects of having two transducers 70A and 70B positioned at a tilt angle 132 angle with respect to each other to expand beam-positioning range. With reference to FIG. 23D, in some preferred embodiments, the transducers 70A and 70B can be positioned so that their respective tilt angle(s) 132 and transducer modulation zones 116 are aligned to provide a common zero-order beam path 72b.

The tilt angle 132b and the frequency of the RF signal applied to the transducer 70B are adapted to provide a first-order beam path $72a_2$ from the transducer modulation zone 116b with a scanning range $134a_2$ that is adjacent to or overlaps the scanning range 134a of the first-order beam path $72a_2$ provided by the transducer modulation zone 16b. In such example, whenever an exit angle 118a, within scan range $134a_1$ is desired, the transducer 70A is modulated at the desired frequency and amplitude while the transducer 70B is effectively turned "OFF" as previously discussed with respect to any of the full extinction techniques, such as simply changing the frequency to provide zero effective Bragg efficiency. Whenever an exit angle $118a_2$ within scan range $134a_2$ is desired, the transducer 70B is modulated at the desired frequency and amplitude while the transducer 70A is effectively turned "OFF." In some embodiments, the zero-order beam path through the AOM $60_3$ can be used as the working beam path to provide a scan range similar to that of scan range $134a_1$ about the zero-order beam path, and the tilt angle 132 and frequency applied to the transducer 70B could be adjusted to provide a scan range $134a_2$ that is adjacent to or overlaps the scan range $134a_1$.

The second transducer 70B with the tilt angle 132 can also be employed to produce a second beam wherein the frequencies applied to the transducers 70A and 70B are configured to provide two resolvable beam spots simultaneously. The amplitude of the RF signal applied to the transducer 70A (with the transducer 70B receiving a full amplitude signal) can be used to control the power content of both beams. Alternatively, the amplitudes applied to both of the transducers 70A and 70B can be controlled.

Employing the second transducer 70B at a tilt angle 132 can, therefore, be used to extend the overall scanning range while limiting loss due to Bragg efficiency constraints and to provide other advantages similar to those described with respect to FIGS. 20A–20C. Skilled persons will appreciate that such second transducer 70B and the tilt angle 132 can be employed to control the deflection angle on either or both Cartesian axes.

Figure 23E:
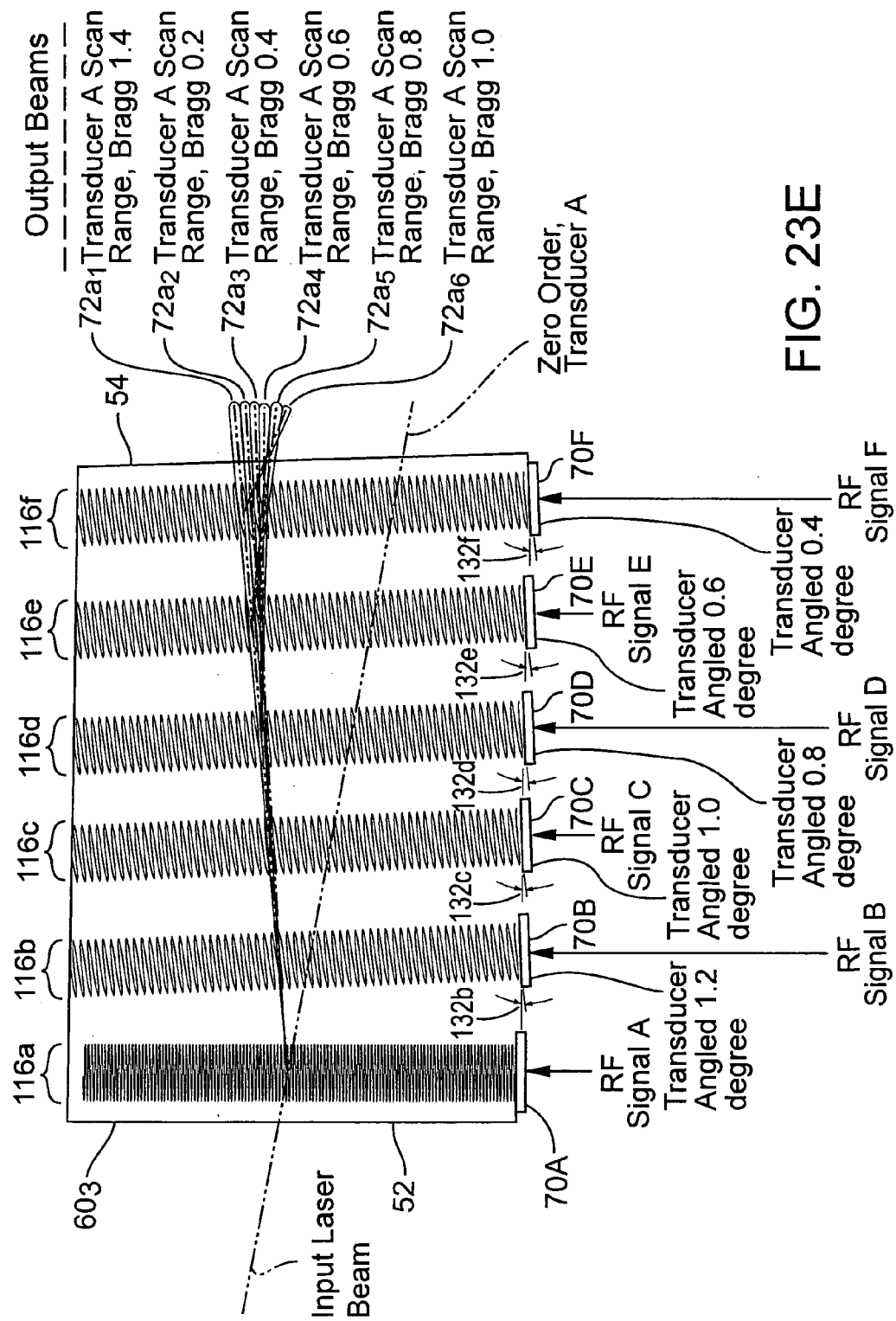
FIG. 23E is a schematic diagram demonstrating the advantages of having multiple transducers positioned at different angles to each other to expand beam-positioning range.
Figure 23F:
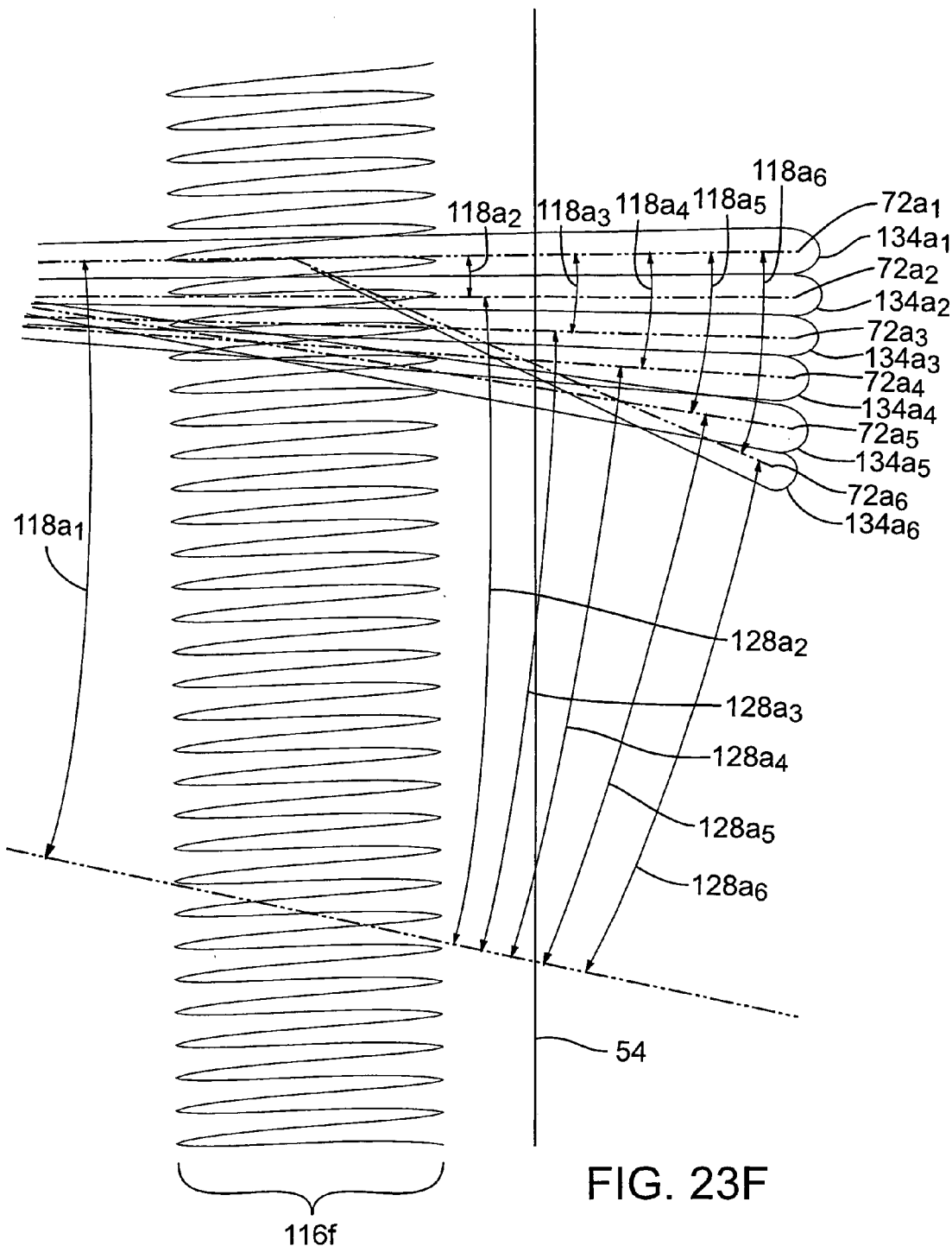
FIG. 23F is a schematic diagram showing an enlargement of a portion of FIG. 23E.

FIG. 23E is a schematic diagram demonstrating the advantages of having multiple transducers 70 positioned at different angles to an AOM side (with respect to the plane of the transducer surface 136a of the transducer 70A) in order to expand beam-positioning range, and FIG. 23F shows an enlargement of a portion of FIG. 23E. With reference to FIGS. 23C–23F, the concept of the tilt angle 132 can be extended to the use of multiple tilted transducers 70A–70F in series to further extend the scanning range of the AOM $60_3$ along a single Cartesian axis.

As previously discussed with respect to FIG. 23C, the input beam path 72 to the AOM $60_3$ is set to achieve a desired Bragg angle to allow for a desirable distance between the zero-order beam path 72b and the first-order beam path 72a, of the first transducer 70A. Frequency modulating the first transducer 70A slightly in either direction will give the allowable scan angle range $134a_1$ for the first-order beam diffracted from the sound wave generated by the transducer 70A in the first transducer modulation zone 116a. FIG. 23E depicts an example employing a 355 nm wavelength beam and an acoustic velocity of 650 m/s with approximately ±0.2 degree as a desirable maximum scan angle range $134a_1$. An exemplary scan angle range 134a, of ±0.1 degree could, however, have alternatively been used and would provide a higher diffraction efficiency, corresponding to only a 20% loss in efficiency at the maximum of 0.1 degree away from the Bragg condition.

To extend the range, the second transducer 70B can be tilted at a tilt angle 132b (with respect to the plane of the transducer surface of the first transducer 70A) that is equivalent to:

$$\text{tilt} = \text{Incoming Bragg Angle} - \text{Separation Angle} \quad (9)$$

where the Incoming Bragg Angle is the Bragg angle of the first transducer 70A and the Separation Angle defines the amount of overlap desired between the scan angle 134 of the second transducer 70B with that of the first transducer 70A. This can be seen in terms of diffraction efficiency in FIG. 23E.

In the case of FIG. 23E, the incoming Bragg angle is set to 1.4 degrees, which is obtained by using an AOM material with an acoustic velocity of 650 m/s, 355 nm wavelength of light, and an RF frequency of 90 MHz applied to the first transducer 70A. If a separation of 0.2 degree is desired for overlap of the diffraction beam resulting from the second transducer 70B, then a tilt angle 132 of 1.2 degrees is employed. The frequency of the RF signal applied to the second transducer 70B would then be set to approximately 12.8 MHz to produce the Bragg angle of 0.2 degree. This frequency can be calibrated by finding the maximum diffraction efficiency to alleviate any manufacturing tolerances in precision manufacturing of any of the transducers 70 or any of their respective tilt angles 132 on AOM $60_3$. Since the first transducer 70A is set to have an outgoing beam at an exit angle $118a_1$ of 1.4 degrees impinging on the second transducer modulation zone 116b caused by the 1.2-degree tilt angle 132b of the second transducer 70B, the Bragg condition of 0.2 degree is matched for the second transducer 70B. In this case, if range beyond the scan angle range $134a_1$ of the first transducer 70A is desired, then the first transducer 70A is used to cause diffraction at a desired amplitude and RF frequency satisfying the Bragg equation for the transducer 70A. The resulting beam path $72a_1$ will then be diffracted by the second transducer 70B, which is run at full amplitude and a frequency at which the desired exit angle $118a_2$ and cooperative deflection angle $128a_2$ are achieved for positioning the beam spot on the workpiece 80.

This concept can then be extended for the additional transducers 70C–70F, lining up the tilt angles 132c–132f and the transducer modulation zones 116c–116f so that the respective scanning angle ranges $134a_3$–$134a_6$ have the desired diffraction efficiencies. In this example, a diffraction angle of ±0.1 degree is desired, so a tilt angle 132 of 1.0 degree is required to satisfy equation (9) using an incoming Bragg angle of 1.4 degrees for the first transducer 70A and a separation of 0.4 degree. In this example, a 0.4-degree separation is used for the transducer 70C because the second transducer 70B scan angle range $134a_2$ of ±0.1 degree is taken into account in the separation angle. If an angle in scanning is desired that falls within the scan angle range $134a_3$ of the transducer 70C, then RF power is applied to the first transducer 70A to control the amplitude desired at the workpiece 80 and at a frequency satisfying the Bragg equation, and full RF power is applied to the transducer 70C at a frequency between 19.1 MHz and 32 MHz to achieve the desired exit angle $118a_3$ and desired cooperative deflection angle $128a_3$ for positioning the beam on the workpiece 80. The transducer 70C would be most efficient at its Bragg angle of 0.4 degree at a frequency of approximately 25.6 MHz.

This same logic used to find the tilt angle 132c of the transducer 70C can be applied to determining tilt angles 132 for the additional transducers 70 in the series. In this example, the transducer 70D is set to a tilt angle 132d of 0.8 degree, making a Bragg condition of 0.6 degree; the transducer 70E is set to a tilt angle 132e of 0.6 degree, making a Bragg condition of 0.8 degrees; and the transducer 70F is set to tilt angle 132f of 0.4 degree, making a Bragg condition of 1.0 degree. If any of these extended scan angle ranges 134 are needed, then the RF power is applied to the first transducer 70A at the desired amplitude and frequency satisfying the Bragg condition, and the respective transducer 70 that is needed is given full RF power at the frequency for the scan range of the particular transducer 70. As noted earlier, the angle cuts for the placements of the transducers 70 on the AOM $60_3$ may not be perfect, so slight frequency adjustments from the frequencies meeting the theoretical Bragg conditions may be desirable.

In addition to determining scan ranges based on minimum desirable diffraction efficiency, skilled persons can implement a power budget and employ amplitude compensation, preferably on the first transducer 70A, for Bragg angle efficiency deviation as previously described.

Although the example employs decreasing respective tilt angles 132 and respective frequencies as the respective distances of the transducer modulation zones 116 increase from the beam entrance surface 52, skilled persons will appreciate that the transducers 70B–70F and their respective tilt angles 132, transducer modulation zones 116, and frequencies can be placed in any order with respect to the beam entrance surface 52. For example, the transducers 70F and 70C, with their accompanying tilt angles 132 and frequencies, could be positionally exchanged.

Also as previously discussed, the tilt angles 132 may extend inwardly or outwardly, and the transducers 70 may be displaced and positioned on the generally opposed transducer sides of the AOM $60_3$. One advantageous embodiment could alternately position the transducers 70A–70F on the generally opposed sides such that transducers 70A, 70C, and 70E are generally on one side of the AOM $60_3$, and the transducers 70B, 70D, and 70F are generally on the other side of the AOM $60_3$.

Also as previously discussed, the transducer modulation zone 116a may be parallel to the beam entrance surface 52, and the last serial transducer modulation zone 116f may be parallel to the beam exit surface 54, such that the beam entrance surface 52 and the beam exit surface 54 are nonparallel. In other preferred embodiments, one of the transducer modulation zones 116 is parallel to the beam entrance surface 52 and the beam exit surface 54 such that the beam entrance surface 52 and the beam exit surface 54 are parallel. In yet other preferred embodiments, one of the transducer modulation zones 116 is parallel to the beam entrance surface 52, and the beam exit surface 54 may be at an angle that is an average of 90 degrees and 90 degrees ±the tilt angle 132f, may be at an angle that is parallel to the transducer modulation zone 116 that represents the mean, or may be at some other angle between 90 degrees and 90 degrees ±the tilt angle 132b. Alternatively, the beam entrance surface 52 may be angled with respect to the first transducer modulation zone 116a, and the beam exit surface 54 may be parallel to the last transducer modulation zone 116f.

Skilled persons will appreciate that large numbers of serial tilted transducers 70 can be employed depending on the overall desirable scan range, the tilt angles 132, the relative positioning arrangements and order, the size of the transducers 70, the properties of the AOM material, any size limitations of the AOM $60_3$ with respect to manufacture or system alignment, or any other variables known to skilled practitioners. In some exemplary embodiments, two to five or two to ten tilted transducers 70 are employed. In other exemplary embodiments, at least three tilted transducers 70 or more than 15 transducers 70 are employed. In these exemplary embodiments, the AOM $60_3$ can still be less than a few inches long or less than 10 cm long, but can be longer if desirable.

Although in some preferred embodiments the transducers 70A–70F may be identical and driven by identical variably controllable RF drivers 66 as previously discussed, in some preferred embodiments the transducers 70A–70F and their associate RF drivers 66 may have different operating characteristics or parameters. In particular, in some preferred embodiments, the transducers 70 with respectively greater tilt angles 132 (with respect to the plane of the transducer surface of transducer 70A) may have respectively larger sizes and operate at respectively lower frequencies than correspondingly smaller transducers 70.

Figure 23G:
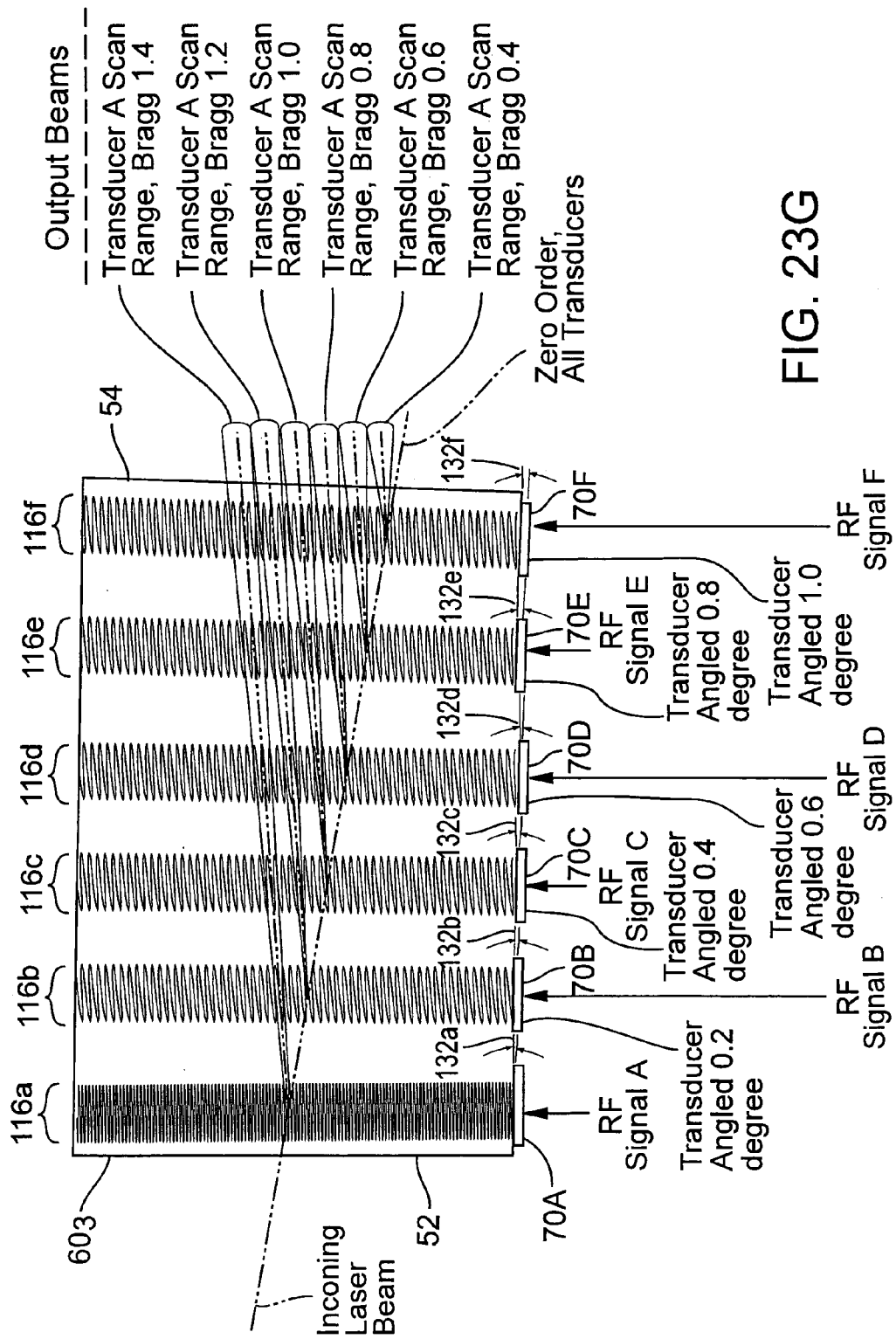
FIG. 23G is a schematic diagram of an alternative embodiment demonstrating the advantages of having multiple transducers positioned at different angles to each other to expand beam-positioning range.

FIG. 23G depicts an alternative embodiment employing multiple tilted transducers 70A–70F demonstrating the advantages of having multiple transducers 70 positioned at different angles to an AOM surface to extend the scanning range of an AOM $60_3$ in a single Cartesian axis. With reference to FIGS. 23C–23G, the tilt angles $132a$–$132f$ and frequencies of the respective transducers 70B–70F can be organized such that zero-order beams are commonly aligned to the zero-order beam path 72b so that their first-order beam paths $72a_1$–$72a_6$ scan ranges $134a_2$–$134a_6$ are adjacent or slightly overlapping. Skilled persons will recognize that transducers 70B–70F are arranged for convenience in reverse positions with respect to their arrangement in FIG. 23E; however, any arrangement would be suitable as previously discussed.

Whenever an exit angle $118a_1$ within scan range $134a_1$ is desired, the transducer 70A is modulated at the desired frequency and amplitude while the remaining transducers 70B–70F are effectively turned "OFF." Whenever an exit angle $118a_2$ within a respective scan range $134a_2$ is desired, the transducer 70B is modulated at the desired frequency and amplitude while the transducers 70A and 70C–70F are effectively turned "OFF." Similarly, whenever an exit angle $118a_3$–$118a_6$ within a respective scan range $134a_3$–$134a_6$ is desired, the respective transducer 70C–70F is modulated at the desired frequency and amplitude while all the other transducers 70 are effectively turned "OFF." One advantage of this embodiment is that only one transducer 70 would need to be activated to achieve any of the scan ranges. Another advantage of this embodiment is that little or no loss is occurring when the zero-order beam path 72b is used as the base beam path for the other transducers 70 to deflect from.

Skilled persons will appreciate that AOM $60_3$ with a plurality of serial tilted transducers 70 can be employed for pulse-picking (with or without the full extinction techniques) and amplitude control in one or both Cartesian axes as previously and hereinafter discussed.

The combination of two AOMs $60_1$ and $60_2$ close together as shown in FIGS. 18, 20, and 21 can produce a very good scanning system as already described; however, the entrance aperture of the second AOM $60_2$ can limit the angle achievable from the first AOM $60_1$. Another inconvenience that is typical of most scanning systems is that the focusing lens 78 will typically be adapted to have a focal length or pupil that is between the two galvanometer positioning devices, which can be replaced by AOMs $60_1$ and $60_2$ as described in the previous embodiments. Additional AOMs 60 (or other beam adjustment device, not shown) may also be employed in series to correct for movement of the pupil when the AOM scanning system is positioned somewhere other than in a condition meeting the back pupil of the focusing lens 78.

Figure 24:
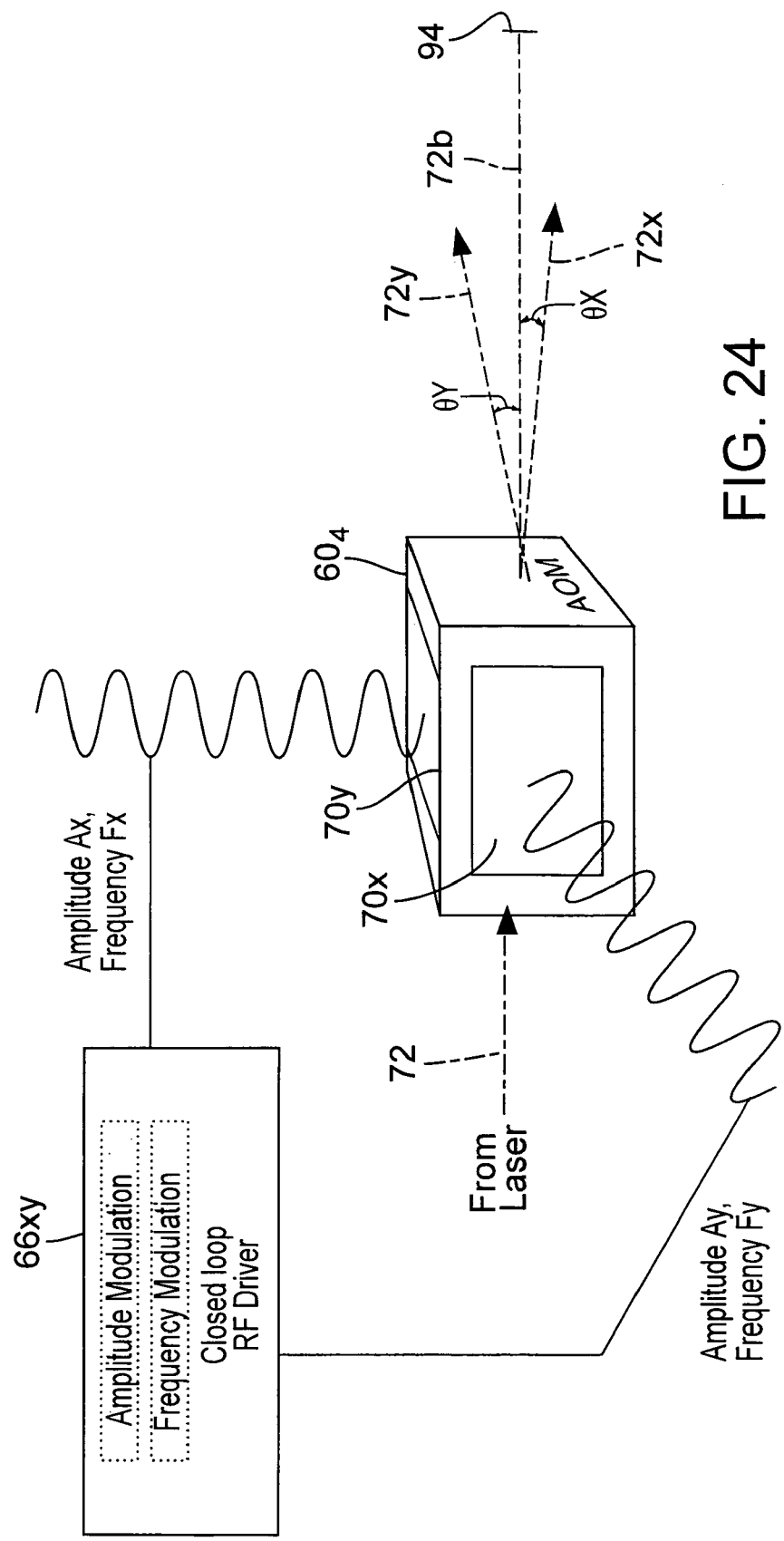
FIG. 24 is a schematic diagram showing an AOM scanning system employing an AOM with at least two transducers.

FIG. 24 is a schematic diagram showing an AOM 60₄ employing transducers 70x and 70y positioned on transverse, and preferably orthogonal, surfaces to modulate different transducer modulation axes (transverse and preferably orthogonal) in a single medium to provide for scanning control of both X and Y axes or directions on the surface of the workpiece 80. With reference to FIG. 24, RF driver(s) 66xy apply signals to transducer 70x to control beam position in the X axis and to transducer 70y to control beam position in the Y axis. Skilled persons will appreciate that each transducer 70 can be driven by the same or different RF drivers 66xy at the same or different frequencies in accordance with any of the previously described AOM modulation techniques or embodiments. One advantage of employing a single AOM 60₄ is that the focusing lens 78 can be reduced in complexity because the focal length can be placed at the output of the single AOM 60₄, and the angle of scanning could then be increased due to not having an entrance aperture limitation for a second AOM 60. Nevertheless, one or more additional single-axis or dual-axis AOMs 60 (or other beam adjustment device, not shown) may also be employed to correct for movement of the pupil when the AOM scanning system is positioned somewhere other than in a condition meeting the back pupil of the focusing lens 78.

Figure 25:
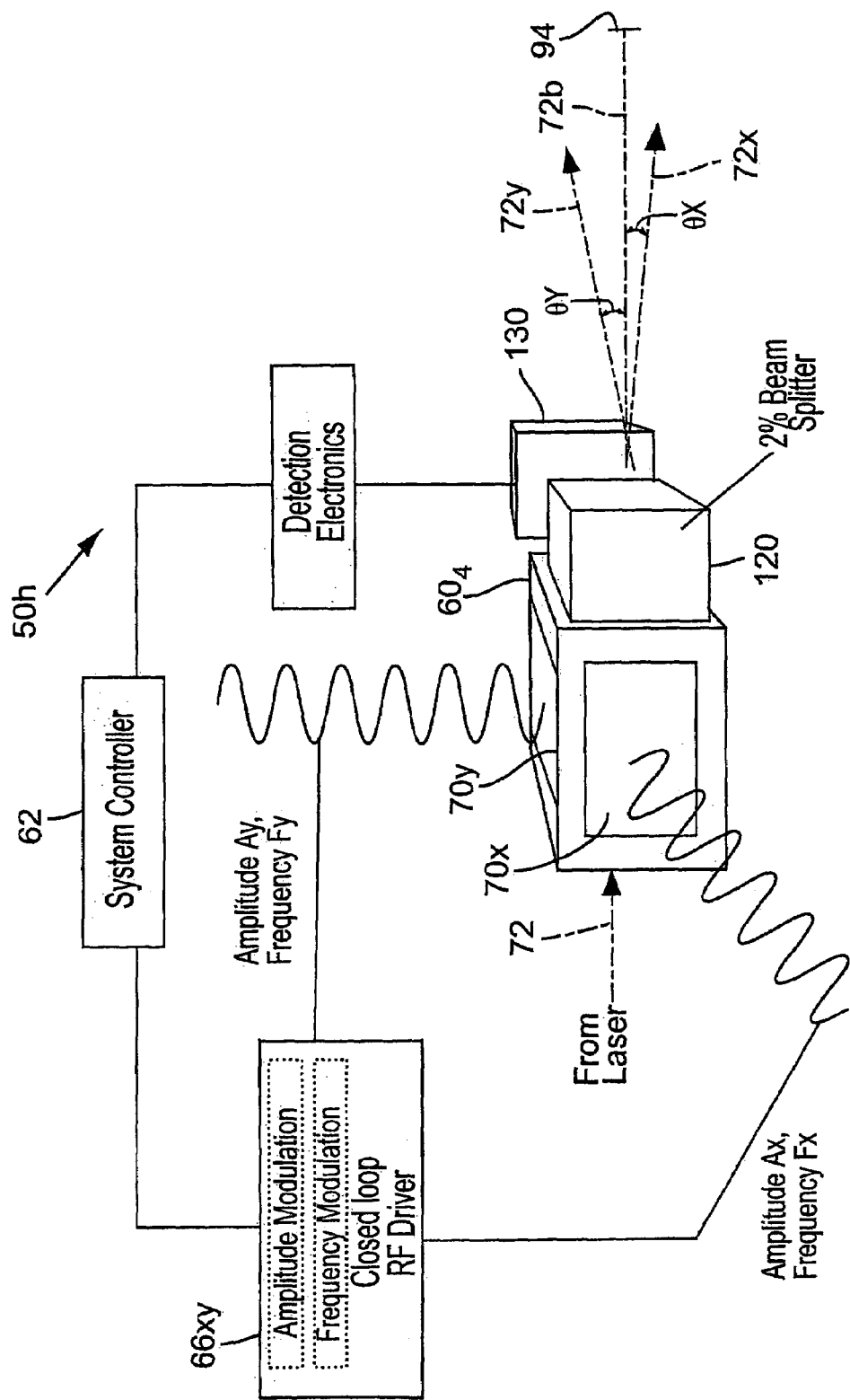
FIG. 25 is a schematic diagram showing an AOM scanning system employing an AOM with at least two transducers and a closed-loop control system.

FIG. 25 shows an exemplary embodiment of AOM 60₄ employed in a laser system 50h that utilizes a closed-loop beam detection and positioning system using a beam-splitting element 120 on the output surface of the AOM 60₄ and a position-sensing detector 130 to detect the angle of the optical path 72 at the exit surface of the AOM 60₄, such as in a combination of the embodiments discussed in connection with FIGS. 21 and 24.

Figure 26:
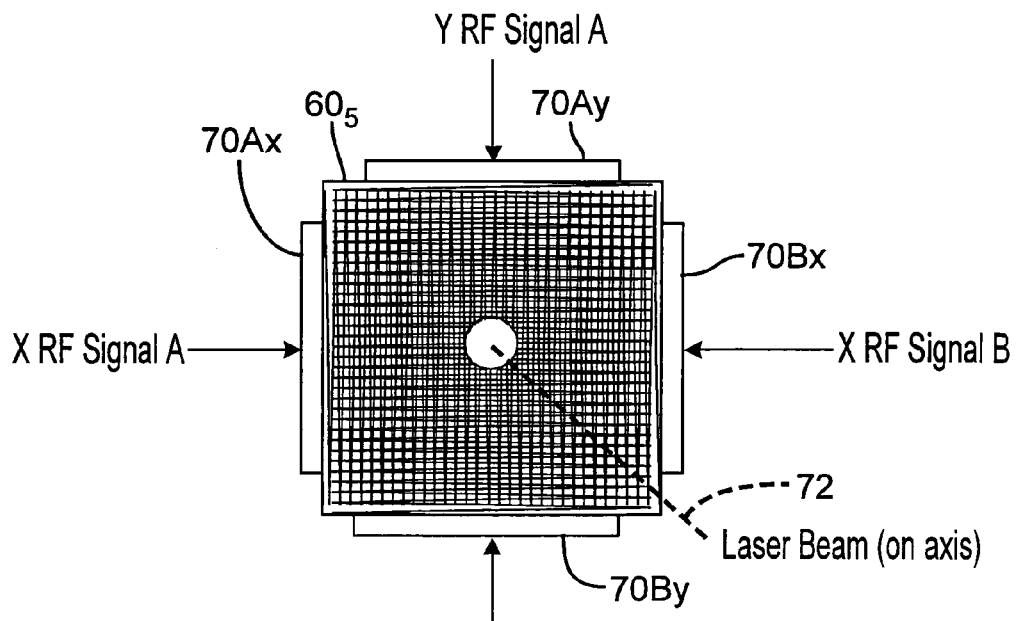
FIG. 26 is a schematic diagram of an AOM employing four transducers.

FIG. 26 is a schematic diagram of an AOM 60₅ employing four transducers 70Ax, 70Bx, 70Ay, and 70By (generically transducer 70). This embodiment combines the advantages described with respect to the AOM 60₃ of FIGS. 22 and 23 with those described with respect to the AOM 60₄ of FIGS. 24 and 25 to facilitate larger scan angles and more versatility. Skilled persons will appreciate that each transducer 70 can be driven by the same or different RF drivers 66 or 66xy at the same or different frequencies in accordance with any of the previously described AOM modulation techniques or embodiments. Skilled persons will appreciate that AOMs 60₄ and 60₅ can be used to replace any AOM 60 previously discussed or any pair of AOMs 60 previously discussed.

Some alternative preferred embodiments of AOMs 60₄ and 60₅ employ a plurality of transducers 70 at tilt angles 132 to extend scanning range as previously discussed. Skilled persons will appreciate that the transducer modulation zones 116 in the transverse Cartesian axes can be non-intersecting, but intersecting transverse-axis transducer modulation zones 116 are preferred. For convenience in manufacture and control, some preferred embodiments employ identical tilt angles 132 for the transducers 70 of intersecting transducer modulation zones 116, but such relationships are not required. In some embodiments employing tilt-angled transducers 70, where the scan ranges are arranged about the zero-order beam path 72b, only a single transducer 70 would need to be activated for each Cartesian axis to provide full extended range scanning control in both axes. Tilt-angled transducers 70 can also be employed in two axes to provide a matrix of beams, with each of the beams having a selectable portion of the energy of the beam entering the AOM 60.

Figure 27:
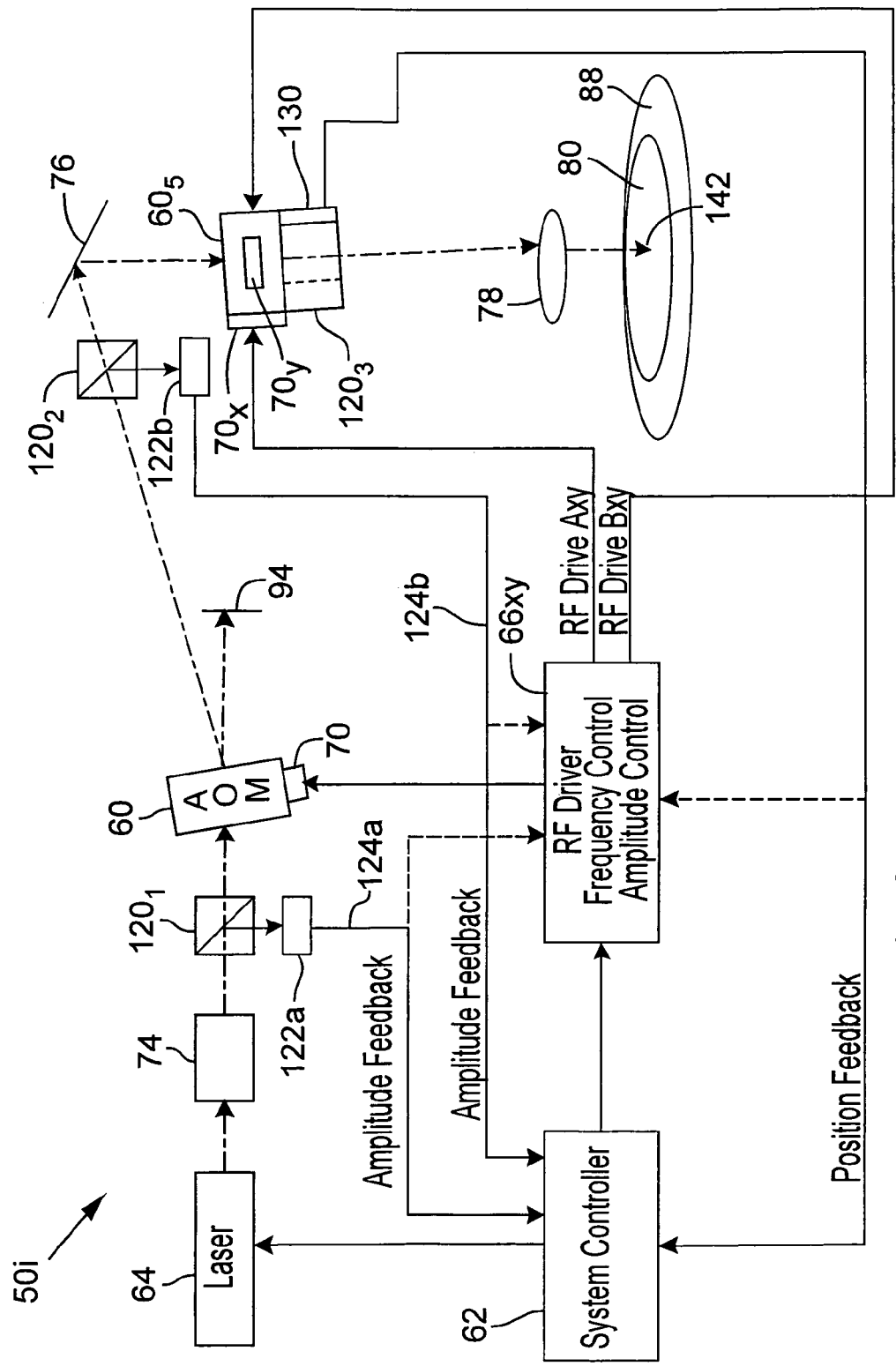
FIG. 27 is a schematic diagram of a laser system employing an extracavity AOM to effect laser pulse gating, and an extracavity AOM employing multiple transducers to effect beam positioning and amplitude modulation with closed-loop control.

FIG. 27 is a schematic diagram of an exemplary laser system 50i employing an extracavity AOM 60 to effect laser pulse gating; an extracavity AOM 60₄ employing multiple transducers 70, a beam-splitting element 120₃, and a position-sensing detector 130 to effect beam positioning with closed-loop control; and beam-splitting elements 120₁ and 121₂ and amplitude detectors 122a and 122b to effect closed-loop amplitude control. With reference to FIG. 27, the amplitude feedback signals 124a and/or 124b may be directed to the system controller 62 and/or the RF driver(s) 66xy. Similarly, the position feedback signal 126 may be directed to the system controller 62 and/or the RF driver(s) 66xy. Skilled persons will appreciate that each transducer 70 can be driven by the same or different RF driver(s) 66xy at the same or different frequencies in accordance with any of the previously described AOM modulation techniques or embodiments.

This embodiment employs a separate AOM 60 as a laser shutter or gate for pulse gating ("pulse picking") to allow pulses to travel through the scanning system only when wanted. In certain embodiments, different angular placement of the pulse picking AOM 60 could be used to eliminate need for the beam dump 94. One advantage of employing a separate pulse-picking AOM 60 is that the AOM 60₄ can be positioned to provide its full angular displacement capabilities. Such a separate pulse-picking AOM 60 can be employed in conjunction with any of the previously described embodiments or AOM modulation techniques. Skilled persons will appreciate, however, that the pulse picking AOM 60 is not required. The AOM 60₄ can be angularly displaced with respect to the optical path 72 such that AOM 60₄ can perform both pulse selection and beam positioning. Such configuration could limit the total scanning angle to the workpiece 80. Skilled persons will appreciate that AOMs 60 employed in any previously described embodiments for beam positioning and/or amplitude modulation can also be employed for pulse picking by selectively positioning the AOM 60 with respect to the optical path 72.

Skilled persons will appreciate that current beam-positioning or scanning systems in laser processing equipment are generally mechanical in nature, being either a galvanometer-based system or a fast-steering-mirror- (FSM) or other type of movable-mirror-based system. Both the galvanometer and FSM techniques have mechanical masses that limit the overall scanning speed of the system. In general, the trade-off between scan angle and scanning speed can be seen in both of these systems: where galvanometer systems have a larger scanning angle and slower speed, whereas FSMs have a smaller scanning angle but higher speed.

Figure 28:
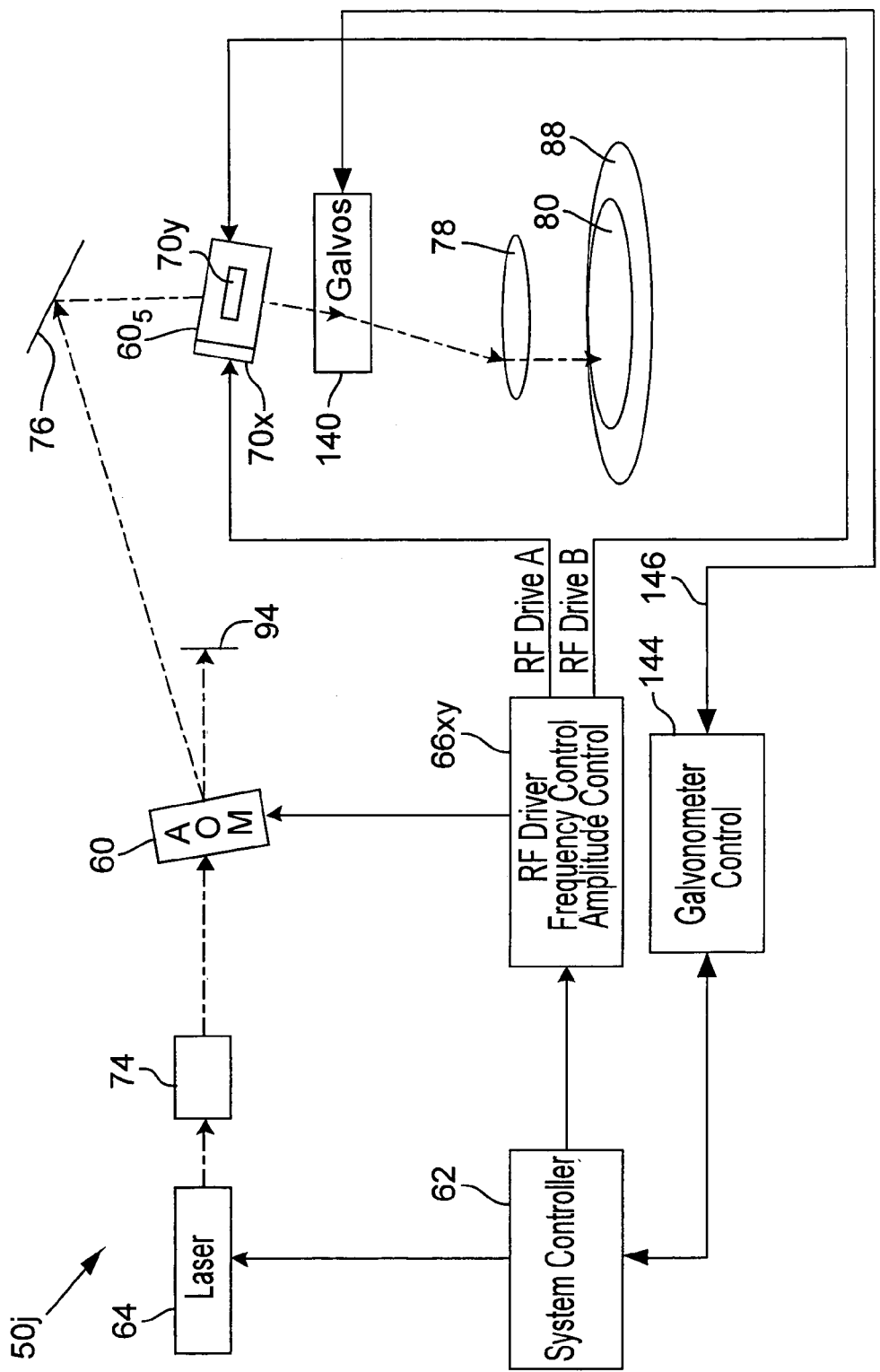
FIG. 28 is a schematic diagram of a laser system employing an extracavity AOM to effect laser pulse gating and an extracavity AOM employing at least two transducers to effect tertiary beam positioning in conjunction with a galvanometer.

FIG. 28 is a schematic diagram of an exemplary laser system 50j having a beam-positioning AOM 60₄ or 60₅ that works in conjunction with a typical fast positioner, such as an FSM or a galvanometer scan head 140 including a pair of galvanometer mirrors, to improve overall throughput of a laser system 50 by having a multiple compound or tertiary beam-positioning system supported by a conventional slow positioner (such as a single axis or split-axis X-Y table). The AOM 60₄ or 60₅ or a pair of AOMs 60 or 60₃ can be upstream or downstream of the galvanometer scan head 140. The motion between the AOM and galvanometer scanning systems can be coordinated directly or indirectly by the system controller 62, with or without the aid of the RF driver(s) 66xy and/or a galvanometer controller 144 that receives galvanometer feedback signals 146 from the galvanometer scan head 140.

Skilled persons will appreciate that a separate AOM 60 for pulse picking is shown and may be used to simplify motion-control coordination; however, the AOM 60 can be omitted and the AOM $60_4$ or $60_5$ can be used for pulse picking as well as for beam positioning. Skilled persons will also appreciate that although an open-loop system is shown for simplicity, alternative embodiments of laser system 50j can easily be implemented to include position and or amplitude feedback for closed-loop control. Skilled persons will also appreciate that the AOM $60_4$ or $60_5$ can be modulated as discussed with respect to any previous embodiment and that laser system 50j can be adapted to incorporate the variations of any previously discussed embodiment.

Figure 29:
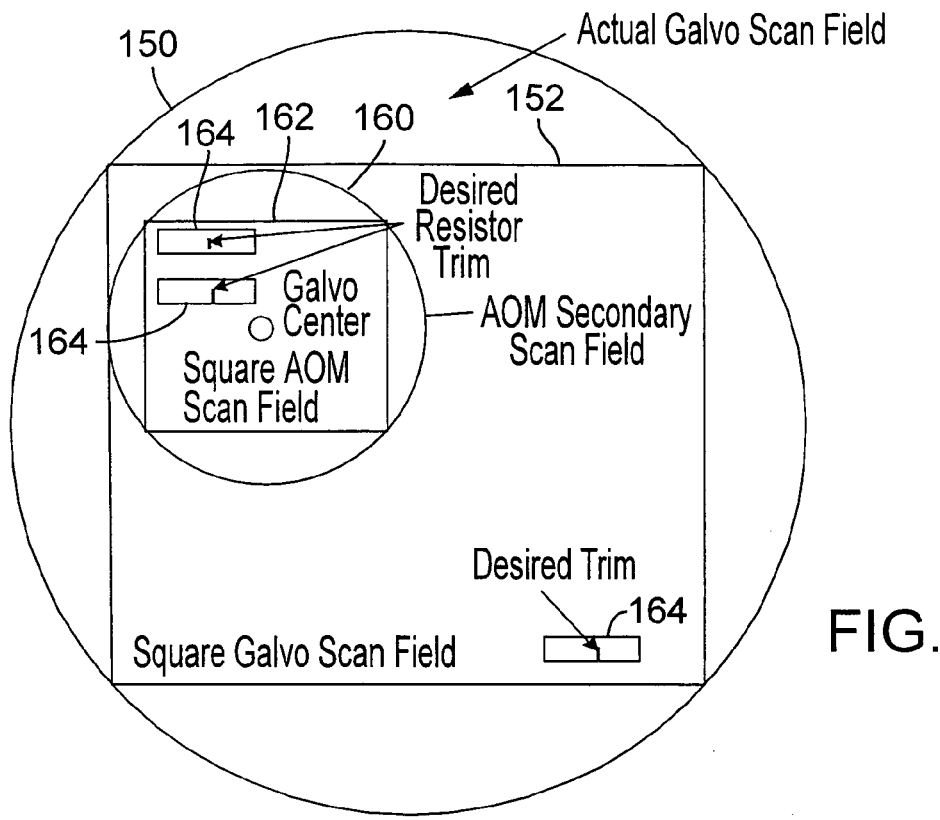
FIG. 29 is a representation of an exemplary scan field of the galvanometer scan head and an AOM as they may be used in conjunction for a laser trimming application.
Figure 30:
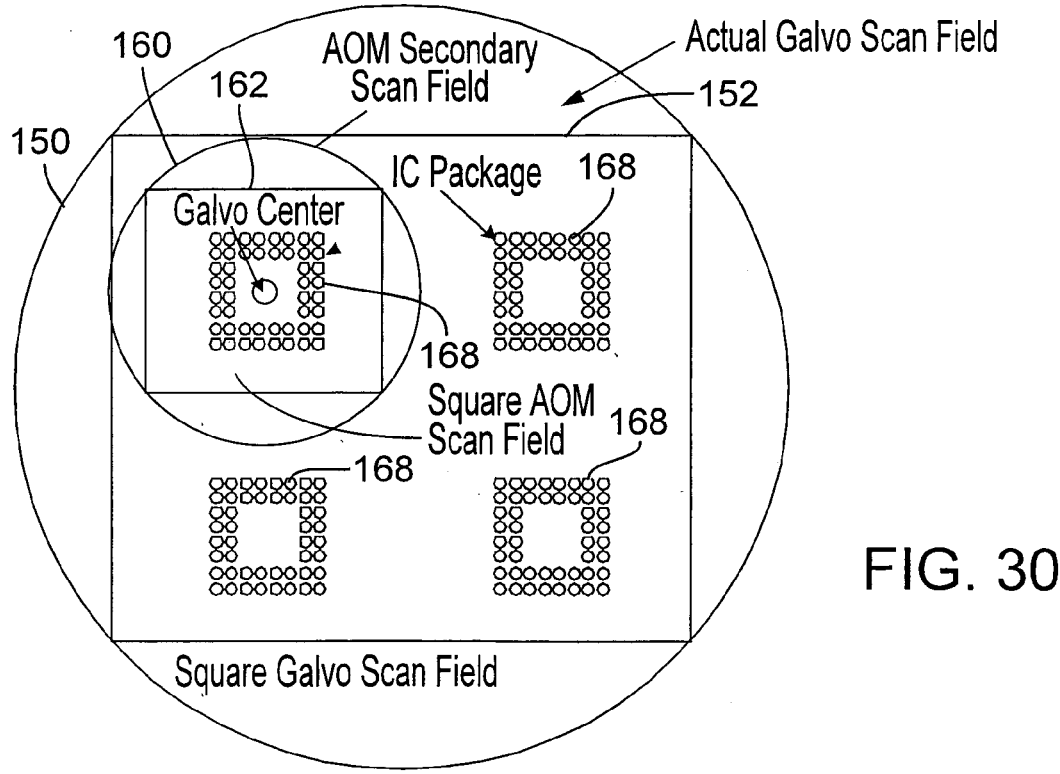
FIG. 30 is a representation of an exemplary scan field of the galvanometer scan head and an AOM as they may be used in conjunction for an integrated circuit (IC) package processing application, such as via drilling.
Figure 31:
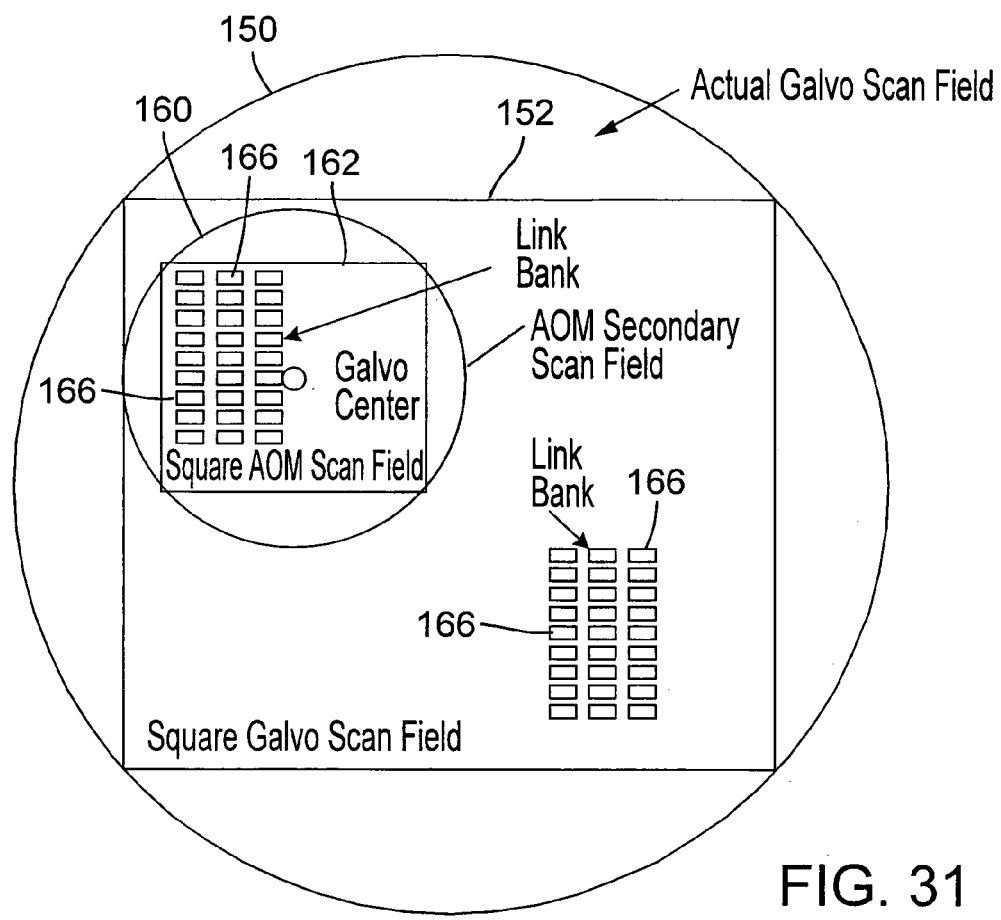
FIG. 31 is a representation of an exemplary scan field of the galvanometer scan head and an AOM as they may be used in conjunction for a laser link severing application.

FIGS. 29, 30, and 31 are representations of exemplary scan fields of the galvanometer scan head 140 and AOM $60_4$ or $60_5$ as they may be used in conjunction for different laser processing applications, such as trimming, via drilling, and link processing, respectively. With reference to FIGS. 28–31 and conventional beam-positioning technology, although an X-Y table may be employed to move the chuck 88 and its supported workpiece 80, the galvanometer scan head 140 may have a fixed position or may be positioned in a split-axis arrangement so that it can be directed along one or more geometrical axes. The relative movement between the galvanometer scan head 140 and the workpiece 80 can be used to position a main galvanometer scan field 150 (and its square galvanometer subfield 152) within a main AOM scan field 160 (and its square AOM subfield 162) with respect to targets on the surface of the workpiece 80. Because the galvanometer bandwidth is much smaller than the AOM bandwidth, the galvanometer (and the workpiece 80) can be kept in continuous motion while the AOM $60_4$ or $60_5$ processes targets within its main AOM scan field 160. This is in addition to the coordinated motion of the linear motor and the galvanometer.

Such an adaptation would be very beneficial for laser applications having very high-density processing sites. The smaller and much faster AOM scan field 160 would be able to process multiple resistors 164, multiple links 166, and multiple IC packages very quickly in one single galvanometer move, instead of numerous conventional galvanometer moves.

In addition to use as a beam-positioning system, as a substitution for an FSM and/or a galvanometer scan head, or as an additional beam-positioning system component, an AOM scanning system could be used for simulated spot enlargement or abbe error correction and can be positioned along the beam path before or after the "fast" positioning components. Furthermore, skilled persons will appreciate that one or more AOMs 60 with or without modulation enhancement may be substituted for (or added to) any of the "fast" positioning system components described in U.S. Pat. Nos. 4,532,402, 5,751,585, 5,847,960, 6,430,465, and 6,706,999 and U.S. Patent Publication No. US 2002/0117481, which are herein incorporated by reference.

It will be obvious to those having skill in the art that many changes may be made to the details of the above-described embodiments without departing from the underlying principles of this invention. The scope of the present invention should, therefore, be determined only by the following claims.

The invention claimed is:

1. A method for enhancing beam positioning control from an AOM suited for positioning along a beam path between a laser and a workpiece having first and second transverse surface axes, the AOM having a beam entrance surface, a beam exit surface, and a first transducer that is positioned on a first transducer surface of the AOM, the first transducer surface being in a first plane that is transverse to the beam entrance surface, comprising:
   generating a laser beam along a beam path that impinges a workpiece;
   propagating the laser beam through the AOM positioned along the beam path;
   controlling a first frequency of a first RF signal applied to the first transducer that modulates within a first transducer modulation zone that traverses the beam path to affect a first exit angle of the beam path along the first surface axis;
   controlling a second frequency of a second RF signal applied to a second transducer positioned on a second transducer surface of the AOM, the second transducer surface being in a second plane that is transverse to the beam entrance surface and the first plane, the second transducer modulating in a second transducer modulation zone that is transverse to the first transducer modulation zone and traverses the beam path to affect a second exit angle of the beam path along the second surface axis; and
   coordinating the first and second frequencies to deflect the beam path along the first and second surface axes to impinge the workpiece at a desired beam position at a cooperative deflection angle resulting from the first and second exit angles imparted by the first and second transducers in response to the first and second frequencies of the first and second RF signals.

2. The method of claim 1 in which the first and second transducer modulation zones are generally orthogonal.

3. The method of claim 1 in which the first and second transducer modulation zones intersect.

4. The method of claim 1 in which the first and second frequencies are different.

5. The method of claim 1 in which the beam path that impinges the workpiece comprises a first order beam path propagated from the AOM.

6. The method of claim 1 in which the beam path that impinges the workpiece comprises a zero order beam path propagated from the AOM.

7. The method of claim 1 in which the beam path impinges the AOM at an angle that is generally perpendicular to the beam entrance surface.

8. The method of claim 1 in which the beam path impinges the AOM at an entrance angle that is at or in proximity to a Bragg angle with respect to the beam entrance surface or the first transducer modulation zone.

9. The method of claim 8 in which the first and second RF signals have respective first and second amplitudes, and the first and/or second amplitude is adjusted to compensate for deviations from Bragg efficiency resulting from shifts in the first and/or second exit angles of the beam path from the Bragg angle.

10. The method of claim 1 in which a third frequency of a third RF signal is applied to a third transducer positioned on a third transducer surface of the AOM, the third transducer surface is generally transverse to the beam entrance surface, and the third transducer modulates in a third transducer modulation zone that traverses the beam path and affects the first exit angle such that the first and third RF signals cooperate to control the first exit angle.

11. The method of claim 10 in which the first and third transducer modulation zones are generally parallel.

12. The method of claim 10 in which the first and third transducer surfaces are coplanar.

13. The method of claim 10 in which the third transducer is spaced-apart and oriented at a small angle with respect to the first transducer such that the first and third transducer modulation zones are nonparallel and non-overlapping.

14. The method of claim 10 in which the first and third frequencies are different.

15. The method of claim 10 in which the first and third frequencies are the same.

16. The method of claim 11 in which the first and third frequencies are generally harmonically related.

17. The method of claim 10 in which the first and third frequencies have different phases.

18. The method of claim 11 in which the first and second frequencies are generally in phase.

19. The method of claim 10 in which the beam path impinges the AOM at an entrance angle that is at or in proximity to a Bragg angle with respect to the beam entrance surface or the first transducer modulation zone.

20. The method of claim 10 in which the first and third RF signals cooperate to control the first exit angle at a resolution beyond which either of the first or third transducers can provide independently.

21. The method of claim 10 in which the first and third RF signals cooperate to control the first exit angle to include a cooperative deflection angle range beyond deflection angle ranges that either of the first or third transducers can provide independently.

22. The method of claim 1, further comprising:
providing slow and fast movement-controlling signals from a positioning signal processor;
controlling with a slow positioner driver a large range of relative beam-directing movement of a translation stage, generally along a translation axis in response to the slow movement-controlling signal;
controlling with the first and/or second transducers a small range of relative beam-directing movement of the AOM in response to the fast movement-controlling signal; and
effecting the large range of relative beam-directing movement between the beam path and the workpiece on the translation stage; and
effecting with the AOM the small range of relative beam-directing movement between the beam path and the workpiece to impinge the workpiece at a desired beam position.

23. The method of claim 22, further comprising:
acquiring error information concerning differences between the beam path and the desired beam position; and
conveying the error information to the first and/or second transducers to compensate for the differences between the beam path and the desired beam position.

24. The method of claim 22, further comprising:
acquiring off-axis information concerning differences between the beam path along a scan line and desired beam positions off-axis but parallel to the scan line; and
conveying the off-axis information to the first and/or second transducers to deflect the laser beam to impinge the desired beam positions parallel to the scan line over the workpiece.

25. An AOM control system for controlling an AOM suited to be positioned along a beam path between a laser and a workpiece, the AOM having a beam entrance surface, a beam exit surface, and a first transducer that is positioned on a first transducer surface, the first transducer surface being in a first plane that is transverse to the beam entrance surface, the first transducer being adapted to modulate within a first transducer modulation zone that traverses the beam path, comprising:
a second transducer attached to a second transducer surface that is in a second plane that is transverse to the beam entrance surface, the second transducer being adapted to modulate within a second transducer modulation zone that traverses the beam path;
a first RF driver including or in communication with a first variable frequency controller adapted to apply a first frequency of a first RF signal to the first transducer to modulate within the first transducer modulation zone to affect a first exit angle of the beam path along a first Cartesian axis; and
a second RF driver including or in communication with a second variable frequency controller to apply a second frequency of a second RF signal to the second transducer to modulate a second transducer modulation zone that is transverse to the first transducer modulation zone to affect a second exit angle of the beam path along a second Cartesian axis that is transverse to the first Cartesian axis such that a cooperative deflection angle results from application of the first and second RF signals contemporaneously.

26. The AOM control system of claim 25 in which the first and second transducer modulation zones are generally orthogonal.

27. The AOM control system of claim 25 in which the first and second transducer modulation zones intersect.

28. The AOM control system of claim 25 in which the first and second RF drivers are adapted to provide independent first and second frequencies.

29. The AOM control system of claim 25 further comprising a beam position controller to coordinate the first and second frequencies to deflect with the AOM the laser beam from the beam path to impinge the workpiece at a desired beam position resulting from the cooperative deflection angle.

30. The AOM control system of claim 25 in which the AOM is adapted to be positioned such that a first order beam is propagated along the beam path.

31. The AOM control system of claim 25 in which the AOM is adapted to be positioned such that the beam path impinges the AOM at an angle that is generally perpendicular to the beam entrance surface.

32. The AOM control system of claim 25 in which the AOM is suited for impingement by the beam path at an entrance angle that is at or in proximity to a Bragg angle with respect to the beam entrance surface or the first transducer modulation zone.

33. The AOM control system of claim 32 in which the first and second RF drivers are adapted to adjust a first amplitude of the first RF signal and a second amplitude of the second RF signal to compensate for deviations from Bragg efficiency resulting from shifts in the first and/or second exit angles of the beam path from the Bragg angle.

34. The AOM control system of claim 25 further comprising:
a third transducer, positioned on a third transducer surface that is in a third plane that is generally transverse to the beam entrance surface, for modulating within a third transducer modulation zone; and
a third RF driver to modulate a third frequency of a third RF signal applied to the third transducer to modulate within the third transducer modulation zone that traverses the beam path and affects the first exit angle such that the first and third RF signals cooperate to control the first exit angle.

35. The AOM control system of claim 34 in which the first and third transducer modulation zones are generally parallel.

36. The AOM control system of claim 34 in which the first and third transducer surfaces are coplanar.

37. The AOM control system of claim 34 in which the third transducer is spaced-apart and oriented at a small angle with respect to the first transducer such that the first and third transducer modulation zones are nonparallel and non-overlapping.

38. The AOM control system of claim 34 in which the first and third RF drivers are adapted to provide different first and third frequencies.

39. The AOM control system of claim 34 in which the AOM is suited for impingement by the beam path at an entrance angle that is at or in proximity to a Bragg angle with respect to the beam entrance surface or the first transducer modulation zone.

* * * * *